United States Patent
Langenberg et al.

(10) Patent No.: US 12,537,008 B2
(45) Date of Patent: Jan. 27, 2026

(54) AUDIO-BASED ACCESS CONTROL

(71) Applicant: Schlage Lock Company LLC, Carmel, IN (US)

(72) Inventors: Daniel Langenberg, Zionsville, IN (US); Joseph W. Baumgarte, Carmel, IN (US); Joshua Long, Greenwood, IN (US); Brady Plummer, Fishers, IN (US); John D. Goodwin, Carmel, IN (US); Dakoda Johnson, Carmel, IN (US); Benjamin J. Hopkins, Zionsville, IN (US); Robert Prostko, Carmel, IN (US); Robert Martens, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/596,161

(22) Filed: Mar. 5, 2024

(65) Prior Publication Data

US 2025/0006198 A1 Jan. 2, 2025

Related U.S. Application Data

(63) Continuation of application No. 17/718,962, filed on Apr. 12, 2022, now Pat. No. 11,922,950, which is a
(Continued)

(51) Int. Cl.
*G10L 17/22* (2013.01)
*G07C 9/00* (2020.01)
(Continued)

(52) U.S. Cl.
CPC .......... *G10L 17/00* (2013.01); *G07C 9/00563* (2013.01); *G10L 15/22* (2013.01); *G10L 17/24* (2013.01); *G10L 2015/223* (2013.01)

(58) Field of Classification Search
CPC ......... G10L 17/00; G10L 15/22; G10L 17/24; G10L 2015/223; G10L 17/22;
(Continued)

(56) References Cited

U.S. PATENT DOCUMENTS 8,712,365 B2 4/2014 Metivier
9,972,154 B1 5/2018 Meyers
(Continued)

FOREIGN PATENT DOCUMENTS

WO 2017181175 A1 10/2017

OTHER PUBLICATIONS

User Authentication made simple with Compound Biometrics, Fortress Identity, Dec. 20, 2019, 8 pages, https://fortress-identity.com/.
(Continued)

*Primary Examiner* — Abul K Azad
(74) *Attorney, Agent, or Firm* — Taft Stettinius & Hollister LLP

(57) ABSTRACT

A method according to one embodiment includes receiving audio input by a microphone of an access control device that controls access through a passageway, processing an audio signal associated with the audio input to identify and authenticate a user, determining a command corresponding with the audio signal in response to identification and authentication of the user, and performing at least one action that corresponds with the command.

20 Claims, 16 Drawing Sheets

Related U.S. Application Data continuation of application No. 16/722,759, filed on Dec. 20, 2019, now Pat. No. 11,302,336.

(60) Provisional application No. 62/811,404, filed on Feb. 27, 2019, provisional application No. 62/810,897, filed on Feb. 26, 2019, provisional application No. 62/783,024, filed on Dec. 20, 2018.

(51) Int. Cl.
  *G10L 15/22* (2006.01)
  *G10L 17/00* (2013.01)
  *G10L 17/24* (2013.01)

(58) Field of Classification Search
  CPC ........ G07C 9/00563; G07C 9/22; G07C 9/37; G07C 9/38; G07C 9/25
  See application file for complete search history.

(56) References Cited

U.S. PATENT DOCUMENTS

| | | | | |
|---|---|---|---|---|
| 11,302,336 | B2* | 4/2022 | Langenberg | G10L 15/22 |
| 11,922,950 | B2* | 3/2024 | Langenberg | G07C 9/22 |
| 2002/0104027 | A1* | 8/2002 | Skerpac | G07C 9/37 |
| | | | | 726/28 |
| 2008/0228365 | A1 | 9/2008 | White et al. | |
| 2012/0169461 | A1 | 7/2012 | Dubois, Jr. | |
| 2012/0245941 | A1 | 9/2012 | Cheyer | |
| 2013/0132091 | A1* | 5/2013 | Skerpac | G07C 9/37 |
| | | | | 704/273 |
| 2015/0350405 | A1 | 12/2015 | Rettig et al. | |
| 2016/0371910 | A1* | 12/2016 | Baumgarte | G07C 9/00817 |
| 2017/0228950 | A1 | 8/2017 | Richmond et al. | |
| 2018/0007060 | A1* | 1/2018 | Leblang | H04L 63/107 |
| 2018/0115897 | A1 | 4/2018 | Einberg et al. | |
| 2019/0013033 | A1* | 1/2019 | Bhimanaik | G10L 19/018 |
| 2019/0253255 | A1 | 8/2019 | Mani et al. | |
| 2019/0312737 | A1* | 10/2019 | Mani | G07C 9/00174 |
| 2019/0327448 | A1* | 10/2019 | Fu | G08B 3/10 |

OTHER PUBLICATIONS

International Search Report; International Searching Authority; International Application No. PCT/US2019/067878; Apr. 28, 2020; 4 pages.
Written Opinion of the International Searching Authority; International Searching Authority; International Application No. PCT/US2019/067878; Apr. 28, 2020; 5 pages.
Australian Examination Report; Australian Patent Office; Australian Patent Application No. 2019403389; Aug. 9, 2022; 2 pages.
New Zealand Examination Report; New Zealand Intellectual Property Office; New Zealand Patent Application No. 778334; Aug. 11, 2022; 3 pages.
Australian Examination Report; Australian Patent Office Australian Patent Application No. 2019403389; Jul. 6, 2022; 3 pages.
Australian Examination Report; IP Australia; Australian Patent Application No. 2022287646; Aug. 9, 2023; 4 pages.
Australian Examination Report; IP Australia; Australian Patent Application No. 2022287646; Sep. 7, 2023; 4 pages.
Canadian Examination Report; Canadian Intellectual Property Office; Canadian Patent Application No. 3,124,635; Sep. 9, 2022; 3 pages.
European Extended Search Report; European Patent Office; European Patent Application No. 19900429.2; Dec. 16, 2022; 13 pages.
New Zealand Examination Report; New Zealand Intellectual Property Office; New Zealand Patent Application No. 778334; Jan. 25, 2023; 3 pages.
New Zealand Examination Report; New Zealand Intellectual Property Office; New Zealand Patent Application No. 778334; May 30, 2023; 1 page.
Communication Pursuant to Rule 164(1) EPC; European Patent Office; Patent Application No. 19900429.2; Aug. 18, 2022; 15 pages.
Canadian Office Action; Canadian Intellectual Property Office; Canadian Application No. 3,207,980; Oct. 3, 2025; 4 pages.
New Zealand Examination Report; New Zealand Intellectual Property Office; New Zealand Application No. 800613; Oct. 10, 2025; 4 pages.

\* cited by examiner

AUDIO-BASED ACCESS CONTROL

CROSS-REFERENCE TO RELATED APPLICATIONS

The present application is a continuation of U.S. patent application Ser. No. 17/718,962 filed Apr. 12, 2022 and issued as U.S. Pat. No. 11,922,950, which is a continuation of U.S. patent application Ser. No. 16/722,759 filed Dec. 20, 2019 and issued as U.S. Pat. No. 11,302,336, which claims the benefit of U.S. Provisional Patent Application No. 62/783,024 filed Dec. 20, 2018, U.S. Provisional Patent Application No. 62/810,897 filed Feb. 26, 2019, and U.S. Provisional Patent Application No. 62/811,404 filed Feb. 27, 2019, the contents of each application incorporated by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

Certain embodiments relate to a unique system, components, and methods for audio-based access control. Other embodiments include apparatuses, systems, devices, hardware, methods, and combinations for audio-based access control. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
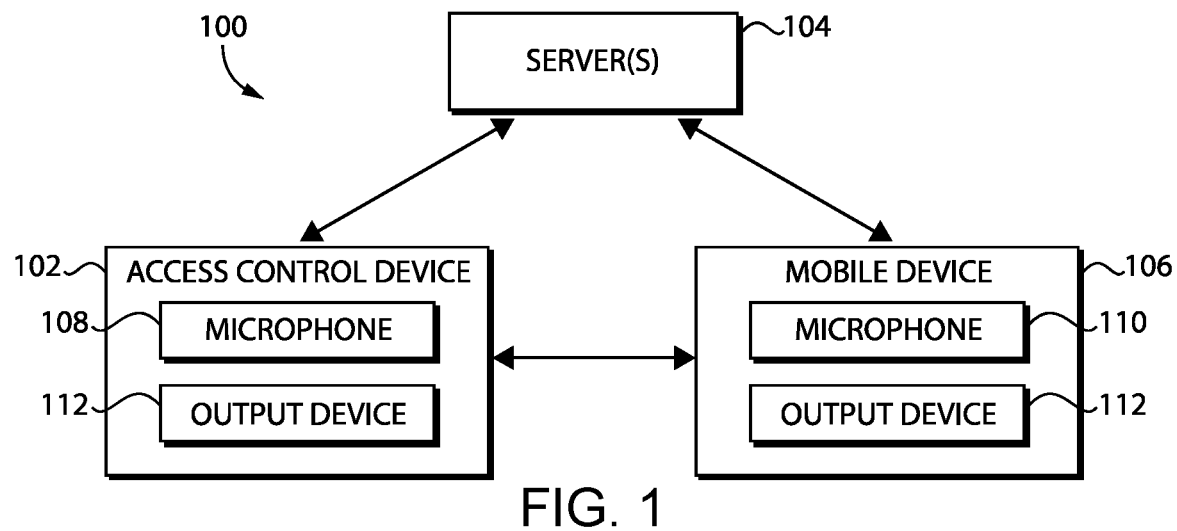
FIG. 1 is a simplified block diagram of at least one embodiment of an access control system for audio-based access control.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, an access control system 100 includes an access control device 102 and one or more servers 104. Additionally, in some embodiments, the access control system 100 may include a mobile device 106. Further, in some embodiments, the one or more servers 104 may include, or be embodied as, one or more management servers, gateway devices, access control panels, mobile devices, and/or other computing devices/systems. As shown, in the illustrative embodiment, the access control device 102 includes a microphone 108 and the mobile device 106 includes a microphone 110. Although described in the singular, it should be appreciated that the access control device 102 and/or the mobile device 106 may include multiple microphones in some embodiments. In certain embodiments, at least one of the access control device 102 or the mobile device 106 further includes an output device 112, such as a display or a speaker.

As described in detail below, in the illustrative embodiment, the access control system 100 may be configured to receive audio input via one or more microphones 108, 110 and process the audio data (e.g., locally at the access control device 102, locally at the mobile device 106, and/or remotely at the server 104) to determine whether the audio data is associated with a command, and perform one or more corresponding actions in response to determining that the audio data is associated with a recognized command. For example, in some embodiments, the audio data may be representative of a user's human voice enunciating an audible command to the access control device 102 (e.g., to unlock a lock mechanism of the access control device 102). In embodiments in which the audio data corresponds with that of a person, it should be appreciated that the access control system 100 (e.g., locally at the access control device 102, locally at the mobile device 106, and/or remotely at the server 104) may process the audio data to identify and authenticate a corresponding authorized user (e.g., based on a voiceprint of the audio data and reference voiceprints of registered authorized users).

It should be appreciated that each of the access control device 102, the server(s) 104, and the mobile device 106 may be embodied as any type of device or collection of devices suitable for performing the functions described herein. More specifically, in the illustrative embodiment, the access control device 102 may include any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), and/or another type of controller (e.g., an access control panel or a peripheral controller) of a passageway. It should be further appreciated that, in some embodiments, the access control device 102 may include multiple devices in communication with one another (see, for example, the access control device 302 of FIG. 3).

Depending on the particular embodiment, the access control device 102 may include a credential reader or be electrically/communicatively coupled to a credential reader configured to communicate with active and/or passive credentials. For example, in some embodiments, one or more of the credentials may be embodied as a passive credential device having a credential identifier (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, one or more of the credentials may be embodied as a virtual credential stored on the mobile device 106 and/or other computing device of a particular user. For example, the credential device may be "active" in the sense that the credential device has an independent power source (e.g., a rechargeable battery).

In some embodiments, the access control device 102 may have an access control database stored thereon for locally performing access control decisions associated with user access. Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the server(s) 104). As such, in other embodiments, it should be appreciated that such an access control database may be partially or entirely omitted from the access control device 102.

In some embodiments, one or more of the servers 104 may be configured to manage credentials of the access control system 100. For example, depending on the particular embodiment, the server(s) 104 may be responsible for ensuring that the access control devices 102 have updated authorized credentials, whitelists, blacklists, device parameters, and/or other suitable data. Additionally, in some embodiments, the server(s) 104 may receive security data, audit data, raw sensor data, and/or other suitable data from the access control devices 102 for management of the access control system 100. Further, in some embodiments, the server(s) 104 may be configured to communicate with the access control device 102 to receive voice data from the access control device 102 and transmit authentication results (e.g., including user credential data) back to the access control device 102 (e.g., via Wi-Fi) as described herein.

In some embodiments, it should be appreciated that the server(s) 104 may communicate with multiple access control devices 102 at a single site (e.g., a particular building) and/or across multiple sites. That is, in such embodiments, the server(s) 104 may be configured to receive data from access control devices 102 distributed across a single building, multiple buildings on a single campus, or across multiple locations.

It should be further appreciated that, although the server(s) 104 are described herein as one or more computing devices outside of a cloud computing environment, in other embodiments, the server(s) 104 may be embodied as a cloud-based device or collection of devices. Further, in cloud-based embodiments, the server(s) 104 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server(s) 104 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the server(s) 104 described herein. For example, when an event occurs (e.g., data is transferred to the server(s) 104 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the server(s) 104), the appropriate virtual function(s) may be executed to perform the actions before eliminating the instance of the virtual function(s).

It should be appreciated that the access control device 102, the server(s) 104, and/or the mobile device 106 may be configured to communicate with one another via one or more communication networks depending on the particular embodiment. For example, the network may be embodied as any type of communication network(s) capable of facilitating communication between the various devices communicatively connected via the network. As such, the network may include one or more networks, routers, switches, access points, hubs, computers, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In particular, in some embodiments, the access control device 102 (e.g., the audio detection system 306 of the access control device 302) may communicate with the server(s) 104 via a Wi-Fi connection (e.g., via a router and/or gateway device) as described in further detail below.

Each of the microphones 108, 110 may be embodied as any type of device capable of receiving audio input and transmitting the audio input, data, and/or signal for further processing. In particular, each of the microphones 108, 110 may be embodied as any type of device/method of converting sound into digital data. For example, in various embodiments, the microphone 108 and/or the microphone 110 may be embodied as, or otherwise include, one or more coil, condenser, electret, ribbon, crystal (e.g., ceramic, piezoelectric, etc.), boundary/PZM, carbon, and/or other types of microphones. Further, in other embodiments, one or more of the microphones 108, 110 may use other techniques for capturing sound including, for example, using a speaker as a microphone, monitoring vibrations of a surface material (e.g., a faceplate or metal surface), or other suitable audio-capturing techniques.

It should be appreciated that the microphone(s) 108 may be positioned in any suitable location(s) depending on the particular passageway, barrier(s) securing the passageway, access control device 102, and/or other characteristics of the environment. For example, depending on the particular embodiment, the microphone(s) 108 may be secured to, integrated with, embedded within, and/or otherwise attached to the access control device 102, barrier, and/or nearby wall/surface. For example, in reference to the access control device 102 of FIG. 3 (i.e., the access control device 302), the audio detection system 306 may include one or more microphones 108 as described below. Further, in some embodiments, the microphone(s) 108 may be incorporated into multiple devices around the outside of the door to localize the audio. In particular, in some embodiments, the microphone(s) 108 may be incorporated into a doorbell system (e.g., a video doorbell). In some embodiments, the audio may be received from the microphone(s) 108 and communicated to another device. Further, the number of microphones 108 included in, or otherwise associated with, the access control device 102 may vary depending on the particular embodiment. For example, in some embodiments, the microphone(s) 108 may be a single microphone, whereas in other embodiments the microphone(s) 108 may be an array of microphones. In some embodiments, the access control device may have embedded or wirelessly integrated microphone(s) that receive and respond to audio commands (e.g., voice commands) locally at the access control device 102 and/or remotely via the server(s) 104 (e.g., via cloud integration). Further, in some embodiments, a microphone module may be added later to allow for incremental voice control functionality via physical/digital integration. It should be appreciated that the audio received by the microphone(s) 108, 110 and processed may be a human's voice or a sound (e.g., breaking glass, gunshot, etc.) depending on the particular embodiment.

It should be appreciated that each of the access control device 102, the server(s) 104, and/or the mobile device 106 may be embodied as one or more computing devices similar to the computing device 200 described below in reference to FIG. 2. For example, one or more of the access control device 102, the server(s) 104, and/or the mobile device 106 may include a processing device 202 and a memory 206 having stored thereon operating logic 208 for execution by the processing device 202 for operation of the corresponding device.

Although only one access control device 102 and one mobile device 106 are shown in the illustrative embodiment of FIG. 1, the access control system 100 may include multiple access control devices 102 and/or mobile devices 106 in other embodiments. For example, as indicated above, the server(s) 104 may be configured to communicate/manage multiple access control devices 102 in some embodiments.

Figure 2:
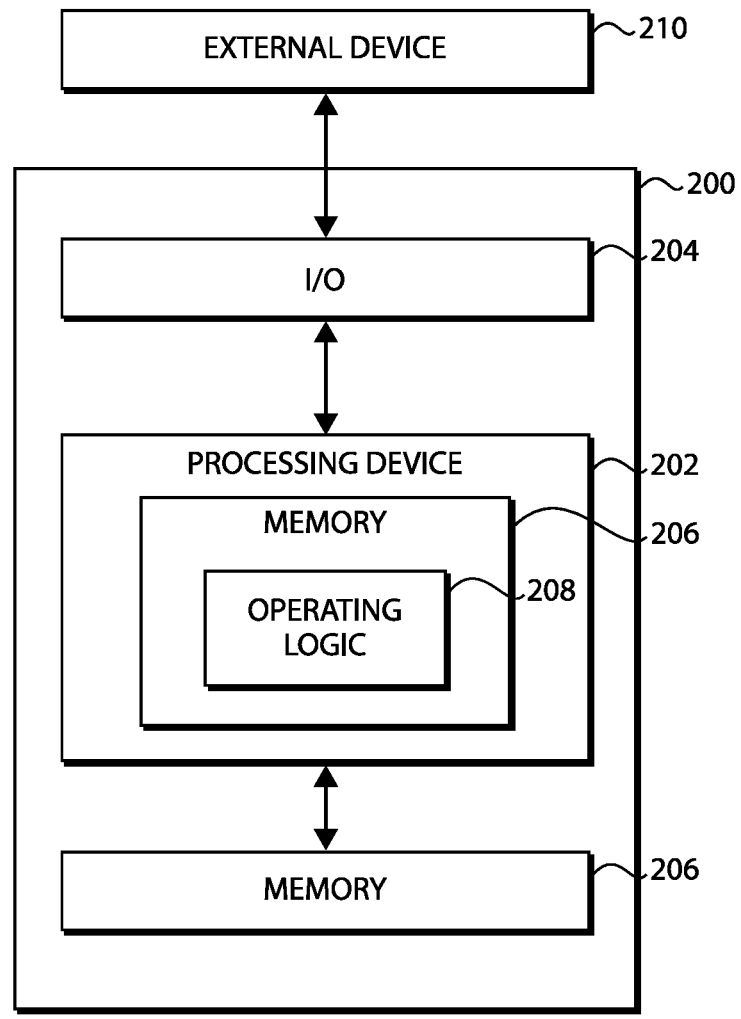
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102, server 104, and/or mobile device 106 illustrated in FIG. 1. Depending on the particular embodiment, computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, monitoring device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, Fire Wire, CAT 5, Wiegand, RS485, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, server(s) 104, and/or the mobile device 106.

Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
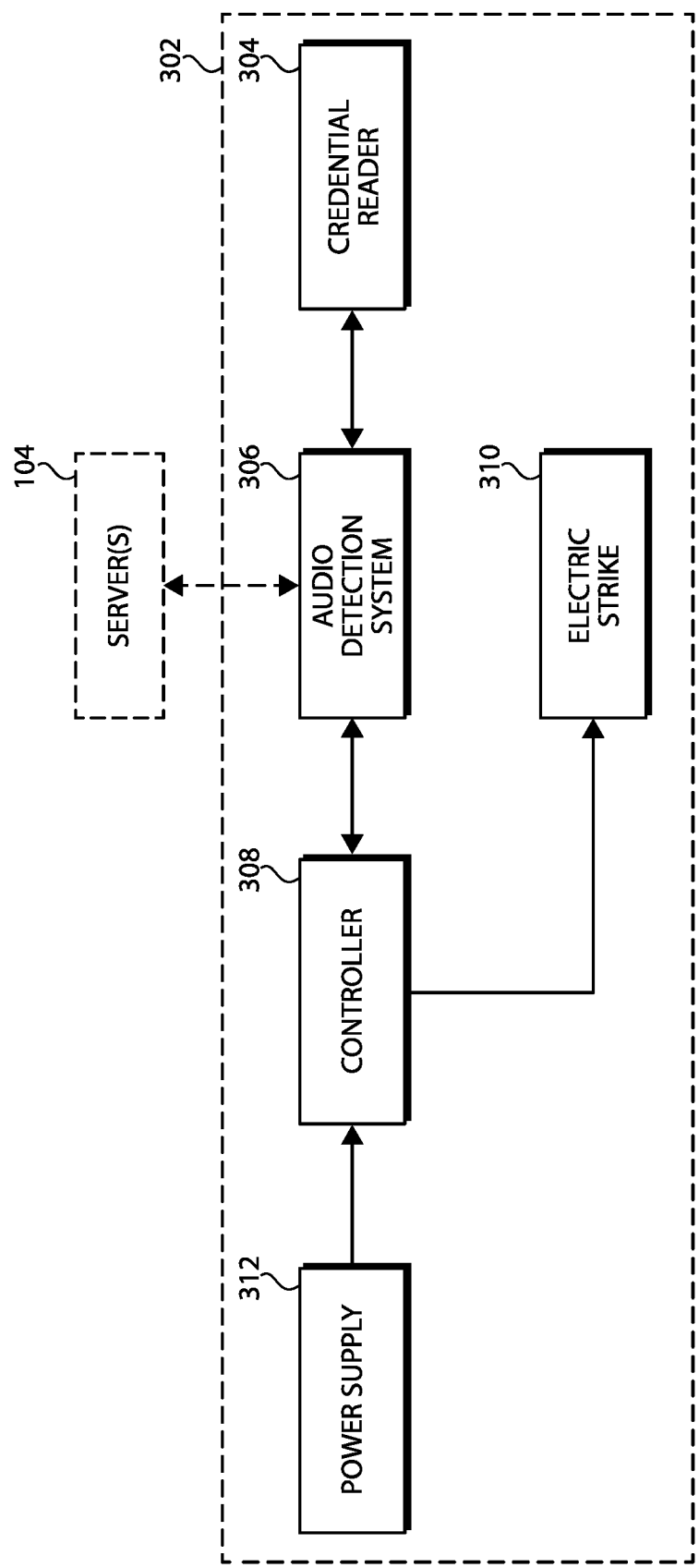
FIG. 3 is a simplified block diagram of at least one embodiment of an access control device of the system of FIG. 1.

In some embodiments, it should be appreciated that the access control device 102 may be embodied as an access control device/system similar to the access control device 302 of FIG. 3. As shown, the illustrative access control device 302 includes a credential reader 304, an audio detection system 306, a controller 308, an electric strike 310, and a power supply 312. It should be appreciated that, in some embodiments, the credential reader 304 may be similar to the credential reader described above. In particular, in some embodiments, the credential reader 304 is configured to communicate with (e.g., read) active and/or passive credentials stored on associated credential devices. For example, in some embodiments, the credential reader 304 may be configured to power a passive credential device by radio frequency (RF) signals transmitted from the credential reader 304 in order to access/read a credential identifier and/or other credential data stored thereon, which may be transmitted to the controller 308 (e.g., via the audio detection system 306 or bypassing the audio detection system 306).

The controller 308 may be embodied as any type of access controller capable of performing the functions described herein and otherwise consistent with the description. For example, in some embodiments, the controller 308 may be embodied as an access control panel (e.g., an integrated access control panel) or a standalone/peripheral controller. Further, in some embodiments, the controller 308 may include one or more components similar to the computing device 200 described above in reference to FIG. 2. In other embodiments, it should be appreciated that the controller 308 and/or the power supply 312 may form a portion of (e.g., by being embedded into) the credential reader 304 and/or the audio detection system 306 (e.g., in an IP-only, powered by PoE system).

As described herein, when a user's credential data is read by the credential reader 304 (e.g., from a credential device presented to the credential reader 304), the user's credential data may be passed to the controller 308 for processing. In some embodiments, as described above, the controller 308 may have an access control database stored thereon for locally making access control decisions based on the user's credential data. For example, the access control database may store credential data, biometric data, historical information, PINs, passcodes, and/or other relevant authentication data in association with registered users. As such, the user's credential data received via the credential reader 304 may be compared to corresponding data in the access control database to determine whether the user is authorized to access a passageway and/or perform another associated function (e.g., in response to a match). In other embodiments, the controller 308 may be configured to communicate with a server 104 and/or other remote device (e.g., having a centralized access control database) in order to offload the authentication processes. In some embodiments, the controller 308 is configured to transmit a signal to the electric strike 310 (e.g., e-strike), thereby causing the electric strike 310 to move a deadbolt, latch bolt, lever, and/or other lock mechanism from a locked state to an unlocked state in response to successful authentication of the user's credential data (e.g., allowing a user access through a doorway/passageway). Although described herein primarily in reference to an electric strike 310 or "e-strike," it should be appreciated that the electric strike 310 may be embodied as, include, or be replaced with an electronic latch, maglock, and/or other security feature in other embodiments. It should be appreciated that the power supply 312 may be configured to directly and/or indirectly power the credential reader 304, the audio detection system 306, and/or the controller 308 (e.g., via line power and/or Power over Ethernet (POE)).

As shown in FIG. 3, in some embodiments, the audio detection system 306 is electrically coupled "between" the credential reader 304 and the controller 308. It should be appreciated that the audio detection system 306 may be embodied as any one or more devices/systems capable of performing the functions described herein. For example, in some embodiments, the audio detection system 306 may be embodied as an audio detection system similar to the audio detection system 400 described below in reference to FIG. 4.

In operation, the audio detection system 306 may be configured to connect and disconnect the credential reader 304 from the controller 308, for example, depending on whether a push button of the audio detection system 306 has been depressed or the user has otherwise indicated an intent to transmit voice data. For example, in the illustrative embodiment, when a user pushes a push button of the audio detection system 306 (e.g., the push button 416 described in reference to FIG. 4), the user may vocalize a message, which is recorded by the audio detection system 308 as voice/audio data and transmitted to the server(s) 104 for authentication (e.g., via Wi-Fi communication). If the user's voiceprint is confirmed and/or the voice/audio data is otherwise determined to correspond with an authorized user, the server(s) 104 may transmit the user's credential identifier and/or other user credential data to the audio detection system 306, which may be passed to the controller 308 for processing. In some embodiments, it should be appreciated that the user credential data received by the audio detection system 306 from the server(s) 104 is the same (or similar) user credential data that would be received by the credential reader 304 from the corresponding user's credential device when presented. As such, the audio detection system 306 may functionally emulate the user's physical credential based on the user's voice, and those processes may be obscured to the controller 308. It should be appreciated that the amount of voice data captured by the audio detection system 306 for transmittal to and processing by the server(s) 104 for user authentication purposes may vary depending on the particular embodiment.

For example, in the illustrative embodiment, the audio detection system 306 is configured to capture four seconds (or approximately four seconds) of audio data from the user; however, a different amount of audio data may be captured/transmitted in other embodiments.

Although the user intent to transmit voice data for authentication purposes is described herein primarily in reference to the activation of a push button, it should be appreciated that the audio detection system 306 may leverage one or more other mechanisms to convey user intent in other embodiments. For example, in some embodiments, the user's intent to transmit voice data and thereby prompt the audio detection system 306 to "hijack" the communication lines may be conveyed using a voice trigger, proximity sense, capacitive sense, inductive sense, BLE communication, biometrics (e.g., fingerprint, iris/retinal scan, facial/feature recognition, etc.), and/or other suitable mechanisms. Further, in some embodiments, the user's voice data may be used as one factor of a multifactor authentication scheme (e.g., in conjunction with the user's physical credential and/or other authentication mechanisms).

Figure 4:
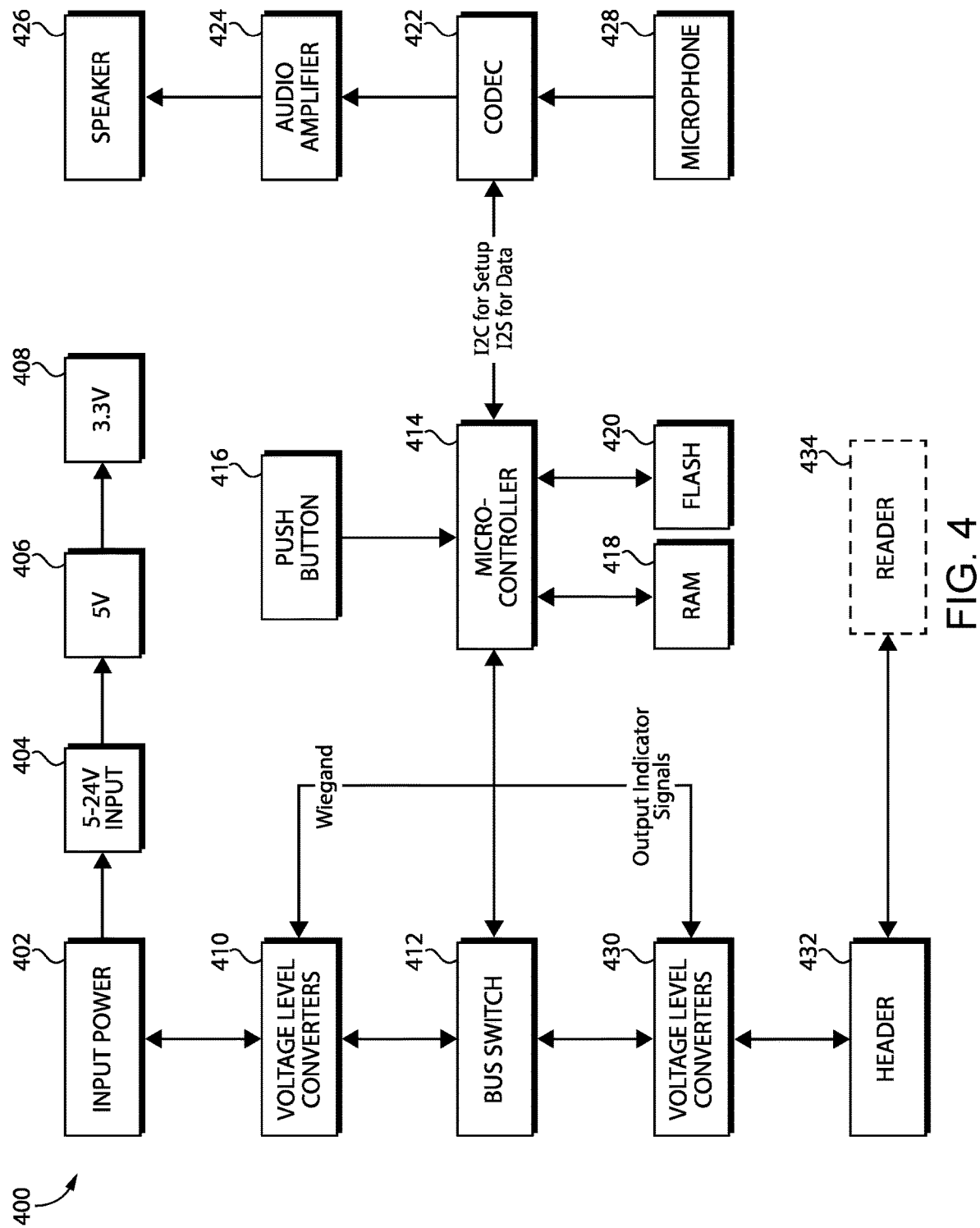
FIG. 4 is a simplified block diagram of at least one embodiment of an audio detection system of the access control device of FIG. 3.
Figure 5:
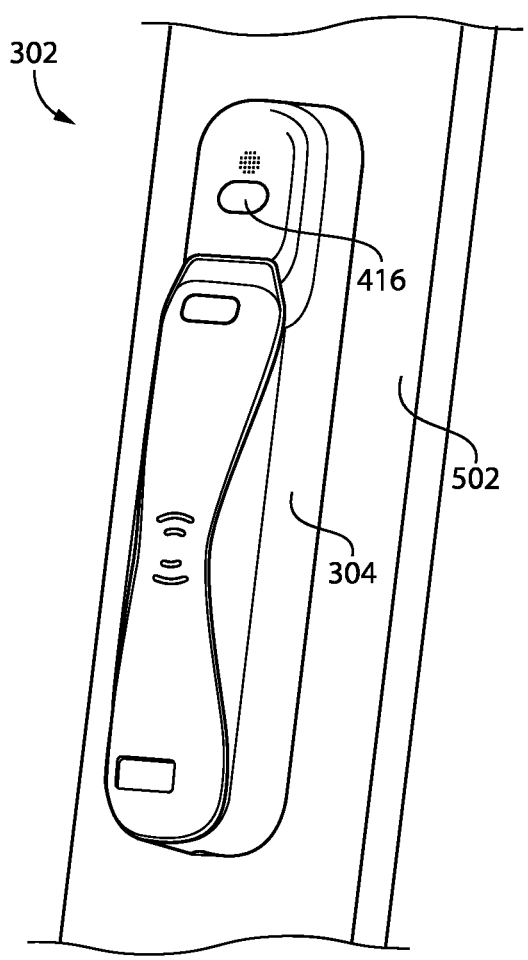
FIG. 5 is a perspective view of at least one embodiment of the access control device of FIG. 3.
Figure 6:
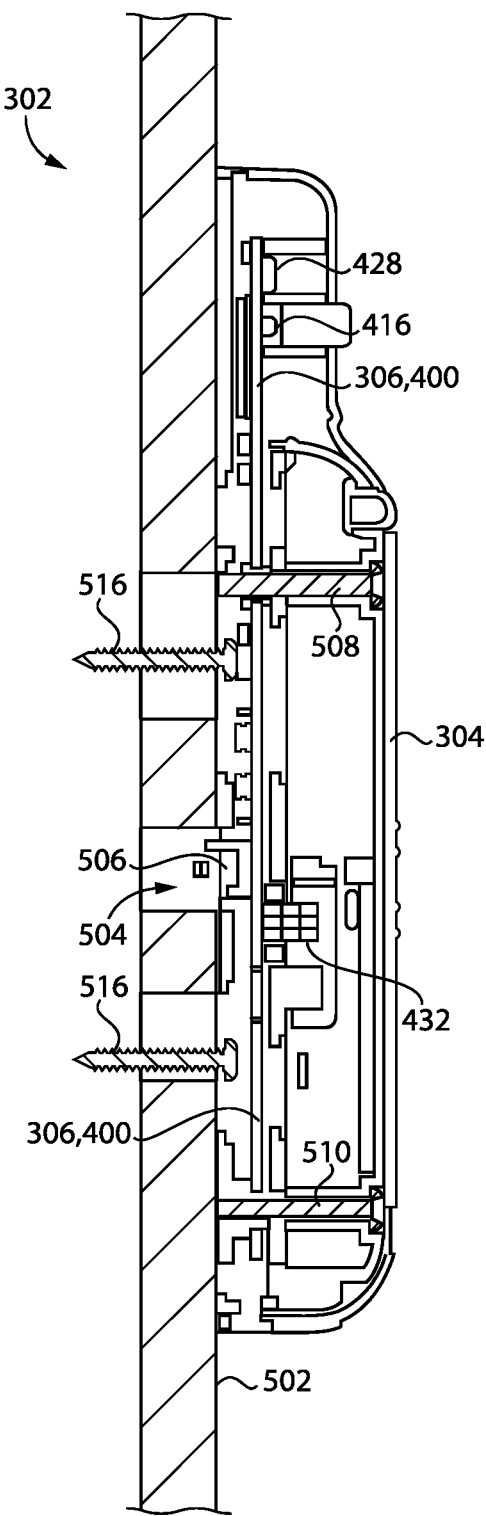
FIG. 6 is a side cross-sectional view of at least one embodiment of the access control device of FIG. 3.
Figure 7:
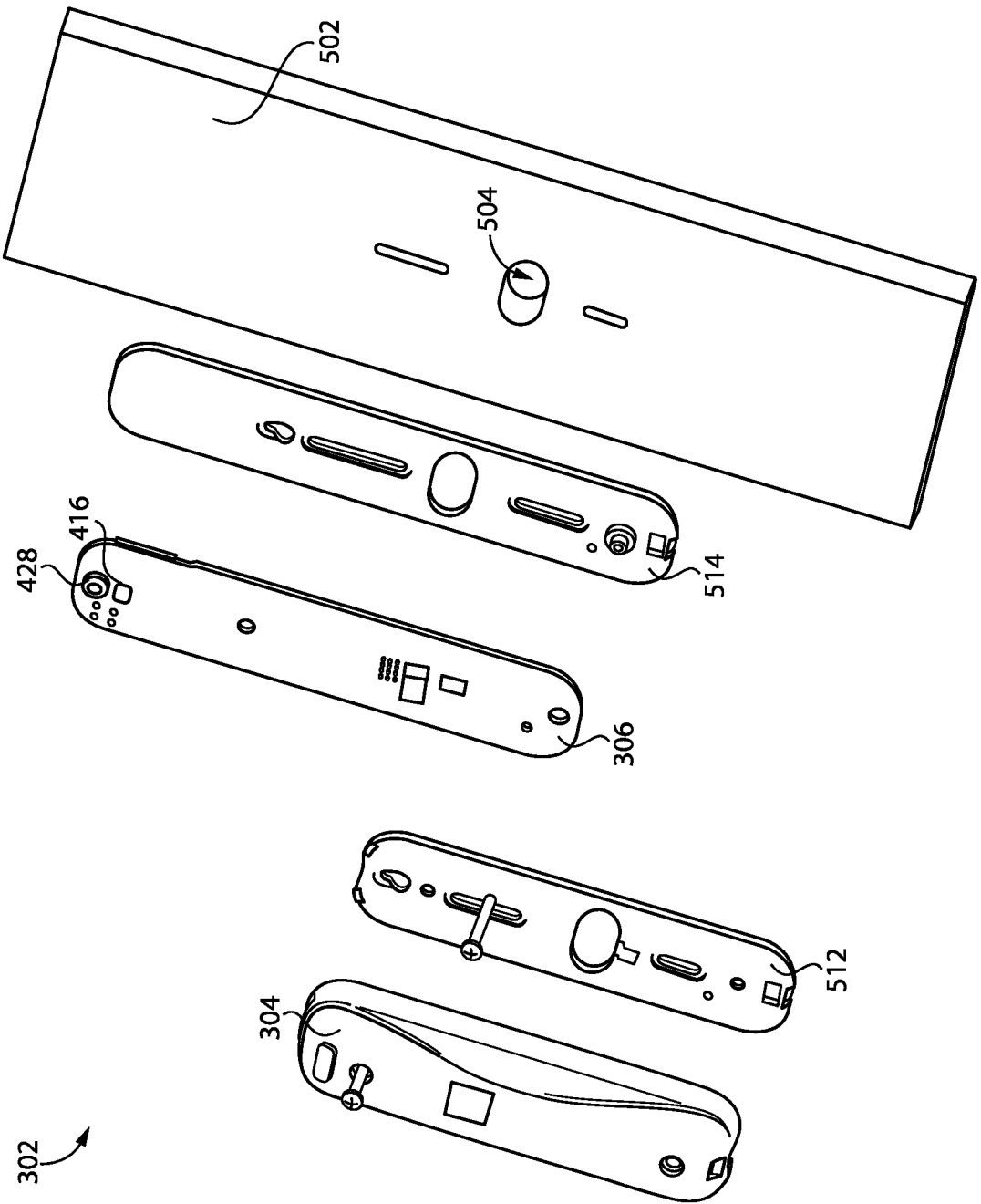
FIG. 7 is an exploded view of at least one embodiment of the access control device of FIG. 3 from a front perspective.
Figure 8:
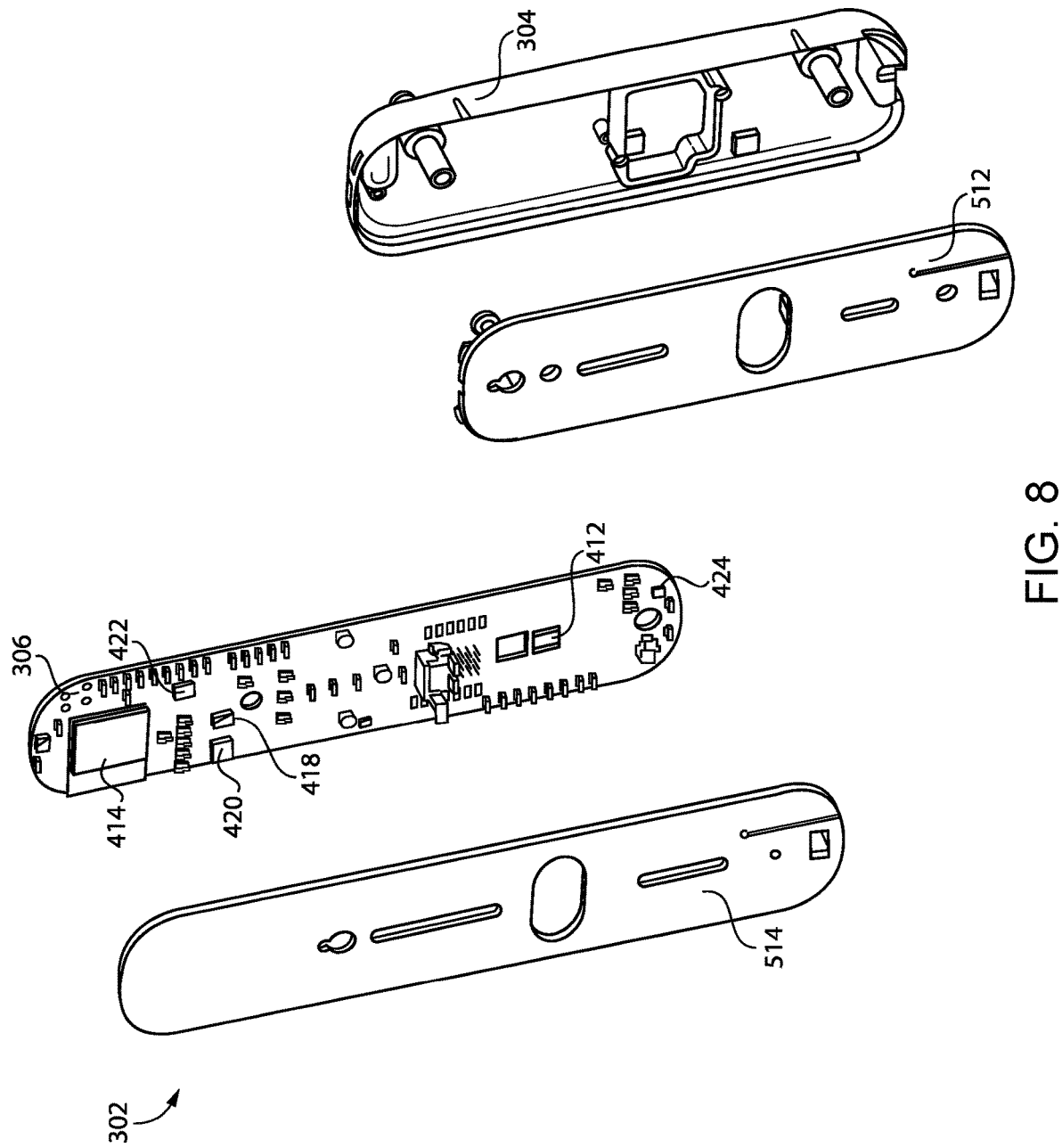
FIG. 8 is an exploded view of at least one embodiment of the access control device of FIG. 3 from a rear perspective.

Referring now to FIG. 4, a simplified block diagram of at least one embodiment of an audio detection system 400 is shown. As indicated above, in some embodiments, the audio detection system 306 of FIG. 3 may be similar to the audio detection system 400 of FIG. 4. As shown, FIG. 4 depicts various features associated with the audio detection system 400 including input power 402, 5-24V input power 404, 5V converted power 406, 3.3V converted power 408, voltage level converters 410, a bus switch 412, a microcontroller 414, a push button 416, RAM 418, FLASH memory 420, an audio codec 422, an audio amplifier 424, a speaker 426, a microphone 428, voltage level converters 430, a header 432, and a reader 434. It should be appreciated that electrical schematics of various components of at least one embodiment of the audio detection system 400 of FIG. 4 are depicted in FIGS. 12-18.

In some embodiments, the input power 402 source may be provided by the controller 308, the power supply 312, and/or another power source. For example, in some embodiments, the input power 402 may be supplied via a power wire/cord protruding from the wall that is traditionally used to supply power to the credential reader 304. In some embodiments, it should be appreciated that the audio detection system 400 may be tolerant to a 24V maximum (or approximately a 24V maximum) and/or may be configured to convert the input power (e.g., 5-24V input 404) into 5V power 406 and 3.3V power 408 for operation of the various components of the audio detection system 400 (e.g., using the voltage level converters 410). In other embodiments, it should be appreciated that the audio detection system 306, 400 may be powered via PoE and, therefore in such embodiments, the audio detection system 306, 400 may communicate with the server(s) 104 via Ethernet communication instead of, or in addition to, Wi-Fi communication.

In the illustrative embodiment, the bus switch 412 may function as a "pass-through" for general or "normal" operation, for example, such as when credential devices are presented to the credential reader 304 as described herein. However, the bus switch 412 may function to disconnect the credential reader 304 from the controller 308 when the audio detection system 400 determines to utilize the microcontroller 414, for example, to communicate audio data to the server(s) 104 for user authentication purposes. In the illustrative embodiment, the bus switch 412 is embodied as a silicon-based switch; however, it should be appreciated that the bus switch 412 may be embodied as any other type of switching device(s) capable of performing the functions described herein in other embodiments. The bus switch 412 may also be electrically coupled to the reader 434 via the voltage level converters 430 and the header 432 (e.g., a male header structured to meet with the reader 434). It should be appreciated that the reader 434 may be similar to the credential reader 304 described above.

In some embodiments, the microcontroller 414 may control the bus switch 412 to control the signal that is transmitted outside the audio detection system 400 (e.g., to the controller 308) via the controlled bus. In the illustrative embodiment, the microcontroller 414 includes Wi-Fi communication circuitry that allows the audio detection system 400 to communicate with external devices via Wi-Fi communication. For example, as described herein, the illustrative audio detection system 400 is configured to communicate with the server(s) 104 over a Wi-Fi communication connection. In particular, it should be appreciated that the audio detection system 400 may directly communicate with a gateway device and/or router via Wi-Fi communication, which in turn may communicate with the server(s) 104, for example, via the Internet. In some embodiments, the microcontroller 414 may further include a Wiegand signal generator and/or a speaker output. As described herein, the push button 416 may be used to indicate the user's intent to use voice-based authentication. In other embodiments, as described above, the audio detection system 306, 400 may be powered via PoE and, therefore, may also be configured to communicate with the server(s) 104 via Ethernet communication. Further, in some embodiments, the audio detection system 306, 400 may be configured to communicate with the server(s) 104 via Ethernet communication even if the audio detection system 306, 400 is line powered or otherwise powered via a non-PoE power source.

It should be appreciated that the microcontroller 414 may be communicatively coupled with and configured to store data to and/or retrieve data from the RAM 418 and the FLASH memory 420. For example, in the illustrative embodiment, the audio detection system 400 may store up to 2 MB (or approximately 2 MB) of raw audio data to the RAM 418 as a buffer for transmittal to the server(s) 104 (e.g., for the voice-based user authentication). Further, in the illustrative embodiment, the audio detection system 400 may store up to 20 MB (or approximately 20 MB) of raw audio data to the FLASH memory 420 when enrolling a user for voice-based authentication. It should be appreciated that the amount of data consumed, for example, by four seconds of audio may vary depending on the sampling rate and resolution. In other embodiments, the audio data may be stored and/or transmitted in a compressed format.

As shown, the illustrative audio detection system 400 includes an audio codec 422 that converts analog audio data captured by the microphone 428 into digital audio data. Further, in some embodiments, the audio detection system 400 includes an audio amplifier 424 and a speaker 426, which allow audio playback of an audio file via the speaker 426. Accordingly, in some embodiments, the audio detection system 400 may utilize audio-based prompts to the user. For example, the audio detection system 400 may playback an audio file that enunciates "Sorry, I didn't get that. Say that again." or a similar prompt in an effort to obtain improved audio data for transmittal to the server(s) 104. It should be appreciated that the conditions that cause a particular prompt and/or the particular available prompts may vary depending on the particular implementation. It should be further appreciated that LEDs, beepers, and/or other output indicators of the reader 434 may be leveraged to prove a user interface.

Referring now to FIGS. 5-8, at least one embodiment of the access control device 302 is shown. More specifically, various portions of at least one physical embodiment of the access control device 302 that are "world facing" are depicted. It should be appreciated that, in some embodiments, the audio detection system 306 hardware may be placed inside a traditional form factor of the credential reader 304 in order to "hijack" the communication lines and provide voice recognition as a second form of authentication (e.g., in addition to physical credentials readable by the credential reader 304). Further, by using the Wiegand and RS232 protocol, it should be appreciated that nearly any installation can be retrofit to include the audio detection system 306 as described herein. In particular, the illustrative audio detection system 306 is retrofit by leveraging a mounting position between the credential reader 304 and the wall 502. Additionally, by using a cost-effective hardware platform, the audio detection system 306 of the access control device 302 enables speaker recognition at every door with significantly reduced costs relative to a full equipment replacement.

In the illustrative embodiment of FIGS. 5-8, the audio detection system 306 is embodied as a printed circuit board (PCB) that includes the various components described herein. However, it should be appreciated that the audio detection system 306 may have a different form factor in other embodiments. As shown and described above, in the illustrative embodiment, the power cable/wire traditionally used to power the credential reader 304 (e.g., from the controller 308) may extend through an aperture 504 defined in the wall 502 and electrically couple with the audio detection system 306 via a power interface 506 of the audio detection system 306. During installation, one or more fasteners 508 may be used to mount the audio detection system 306 to the credential reader 304, and one or more fasteners 510 may be used to mount the credential reader 304 to the reader backplate 512 and/or the audio detection system backplate 514. Further, one or more fasteners 516 may be used to mount the audio detection system backplate 514 to the wall 502.

Figure 9:
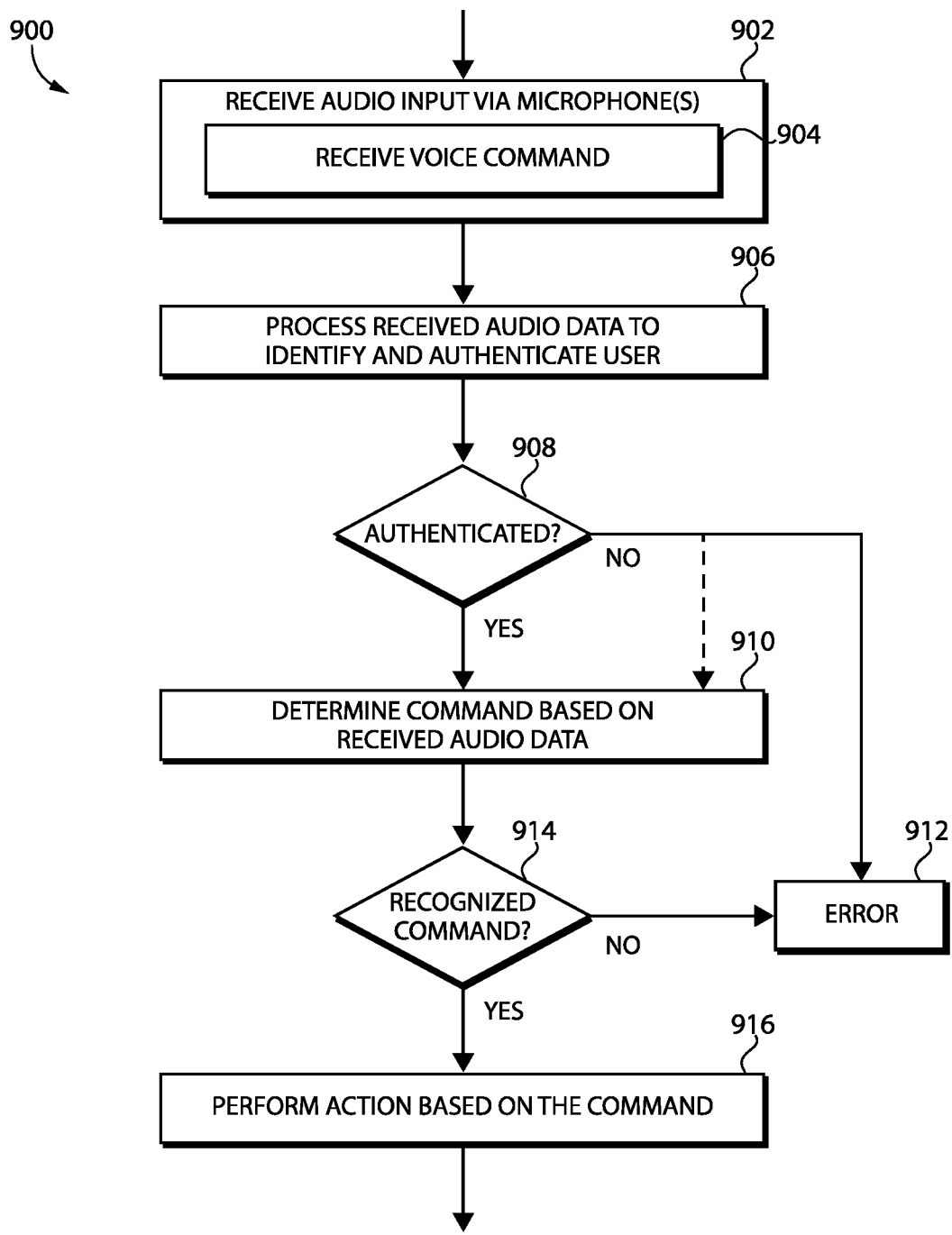
FIG. 9 is a simplified flow diagram of at least one embodiment of a method for performing audio-based access control.

Referring now to FIG. 9, in use, the access control system 100 may execute a method 900 for performing audio-based access control. It should be appreciated that the particular blocks of the method 900 are illustrated by way of example, and such blocks may be combined or divided, added or removed, and/or reordered in whole or in part depending on the particular embodiment, unless stated to the contrary. The illustrative method 900 begins with block 902 in which the access control system 100 receives audio input via one or more microphones. For example, in block 904, the access control system 100 may receive a voice command from a user in the vicinity of the microphone. In other embodiments, however, it should be appreciated that the audio input may be non-voice data (e.g., breaking glass, gunshot, etc.), which may correspond with other commands (e.g., system lockdown, evacuation protocol, etc.).

As indicated above, it should be appreciated that the microphone(s) may be positioned on the access control device 102 and/or the mobile device 106 depending on the particular embodiment. For simplicity of the description, the method 900 assumes that the microphone(s) may be positioned on, or associated with, the access control device 102. However, in some embodiments, it should be appreciated that a user's mobile device 106 may receive a voice command, and the audio may be processed locally at the mobile device 106 or transmitted to the access control device 102 and/or server(s) 104 for processing (e.g., for identification and authentication). For example, in some embodiments, the mobile device 106 may receive and process the voice data using a Fast Identity Online (FIDO) protocol or other suitable decentralized authentication protocol. Further, in some embodiments, the access control system 100 may leverage a geofence to ensure that the mobile device 106 is within a certain range before a command is sent to the access control device 102 (e.g., using triangulation, GPS circuitry of the mobile device 106, RSSI, TOF, and/or other relevant data).

In block 906, the access control system 100 processes the received audio data to identify and authenticate a user (e.g., locally at the access control device 102, locally at the mobile device 106, and/or remotely at the server(s) 104). In some embodiments, the access control system 100 may identify a person's voice from the captured audio, determine an identity of that person (e.g., based on a voiceprint and/or characteristics of the person's voice), and/or confirm that the captured audio is not a recording of the person. It should be appreciated that the audio may be analyzed using any techniques and technologies suitable for distinguishing the voices of individual persons and otherwise performing the functions described herein. It should be further appreciated that the user may be identified and/or authenticated based on reference data (e.g., the user's voiceprint and/or other characteristics of the user's voice) registered during an onboarding/registration process for the user described below. Such data may be stored locally at the access control device 102, locally at the mobile device 106, and/or remotely at the server(s) 104 depending on the device(s) that are intended to perform the identification and/or authentication in the particular embodiment. In some embodiments, the access control system 100 may execute the method 1000 of FIG. 10, the method 1100 of FIG. 11, or a method similar to either of the methods 1000, 1100 in order to authenticate a user based on voice data.

If the access control system 100 determines, in block 908, that a user has been identified and authenticated based on the processed audio data, the method 900 advances to block 910 in which the access control system 100 (e.g., locally at the access control device 102, locally at the mobile device 106, and/or remotely at the server(s) 104) determines a command corresponding with the audio data. However, if the access control system 100 determines, in block 908, that a user has not been identified and authenticated based on the processed audio data, the method 900 may advance to block 912 in which the access control system 100 performs one or more error handling procedures (e.g., terminate the method, wait for additional audio data for verification, utilize a more processing-intensive authentication algorithm, etc.). In some embodiments, it should be appreciated that the method 900 may nonetheless advance to block 910 to determine whether the processed audio data is non-voice data corresponding with a command. It should be appreciated that the access control system 100 (e.g., locally at the access control device 102, locally at the mobile device 106, and/or remotely at the server(s) 104) may utilize any suitable techniques and technologies for identifying a command associated with the audio signal. For example, the processing device (e.g., the access control device 102, the mobile device 106, and/or the server(s) 104) may use artificial intelligence, machine learning, and/or deep learning algorithms and techniques to recognize commands or other information in the audio signal. In some embodiments, the relevant data (e.g., reference data) may be stored locally at the access control device 102, locally at the mobile device 106, and/or remotely at the server(s) 104 depending on the device(s) that are intended to perform the command identification/matching in the particular embodiment.

If the access control system 100 determines, in block 914, that a command has been recognized, the method 900 advances to block 916 in which the access control system 100 (e.g., the access control device 102 and/or the server(s) 104) performs one or more actions corresponding with the command. However, if the access control system 100 does not identify a corresponding command, the method 900 advances to block 912 in which the access control system 100 may perform one or more error handling procedures. It should be appreciated that the particular command/action may vary depending on the particular embodiment. For example, in some embodiments, the command/action may be to unlock a lock mechanism of the access control device 102. In an embodiment in which the audio data is non-vocal, the access control system 100 may determine that the command/action is to place the building on lockdown (e.g., if the audio data is identified as a gunshot) or evacuate the building (e.g., if the audio data is identified as an explosion).

It should be appreciated that the access control system 100 and the techniques described herein allow for voice and audio-based commands to leverage an access control device 102 as a gateway to propagate other routines, recipes, workflows in mesh, and/or other solutions, including those that are not connected to the Internet. In an embodiment, the access control system 100 may be leveraged, for example, in a commercial building. For example, a user that has forgotten her typical credential (card or mobile) may communicate a voice command via the microphone 108 installed in the access control device 102 to be identified, authenticated, and provided access to the building. In another embodiment, the access control system 100 may be leveraged, for example, in a commercial building or healthcare facility to provide accessibility for disabled people. Specifically, a microphone and speaker may form a portion of a reader device associated with an auto operator such that the user is able to communicate a desire to open the door/barrier and simultaneously authenticate their credential using their voice. If additional factors of authentication are required, they may be requested via the speaker and supplemented via voice (e.g., a pin code or passphrase).

Depending on the particular embodiment, users may be on-boarded to the access control system 100 in various ways. For example, in some embodiments, the users may be on-boarded via the microphone 108 in the access control device 102. In particular, in some embodiments, the user may hold down a push button of the audio detection system 306 while presenting a physical credential to the credential reader 304 in order to begin enrollment. The audio detection system 306 may prompt the user to record a certain amount of the user's voice (e.g., 20-40 seconds), and the credential reader 304 may read the user's credential data/identifier from the physical credential. The audio detection system 306 may transmit the raw audio data to the server(s) 104 for analysis (e.g., generation of a voiceprint) and may transmit the user's credential data/identifier to be stored in association with that enrolled user.

In another embodiment, the users may be on-boarded via a web-based application (e.g., at a badge office, through access control software, and/or via a user's mobile/desktop device). For example, the user may login to an application, request enrollment, and record an audio snippet such that their vocal profile or voiceprint may be built. In another embodiment, the users may be on-boarded via a telephone call. For example, the user may call a phone number, prove her identity via a suitable authentication method, and respond to various prompts to build the vocal profile or voiceprint. In yet another embodiment, the users may be on-boarded on a visitor management system accompanying a door. It should be appreciated that any device having, or in communication with, a microphone can be used during the onboarding/registration process to capture the user's voice (or other audio) for processing and subsequent comparison and/or analysis to captured audio (e.g., for calculation of a voiceprint and/or other characteristics of the user's voice). Further, the resultant data of the registration process may be stored locally at the access control device 102, locally at the mobile device 106, and/or remotely at the server(s) 104 depending on the particular embodiment.

Although the blocks 902-916 are described in a relatively serial manner, it should be appreciated that various blocks of the method 900 may be performed in parallel in some embodiments.

Figure 10:
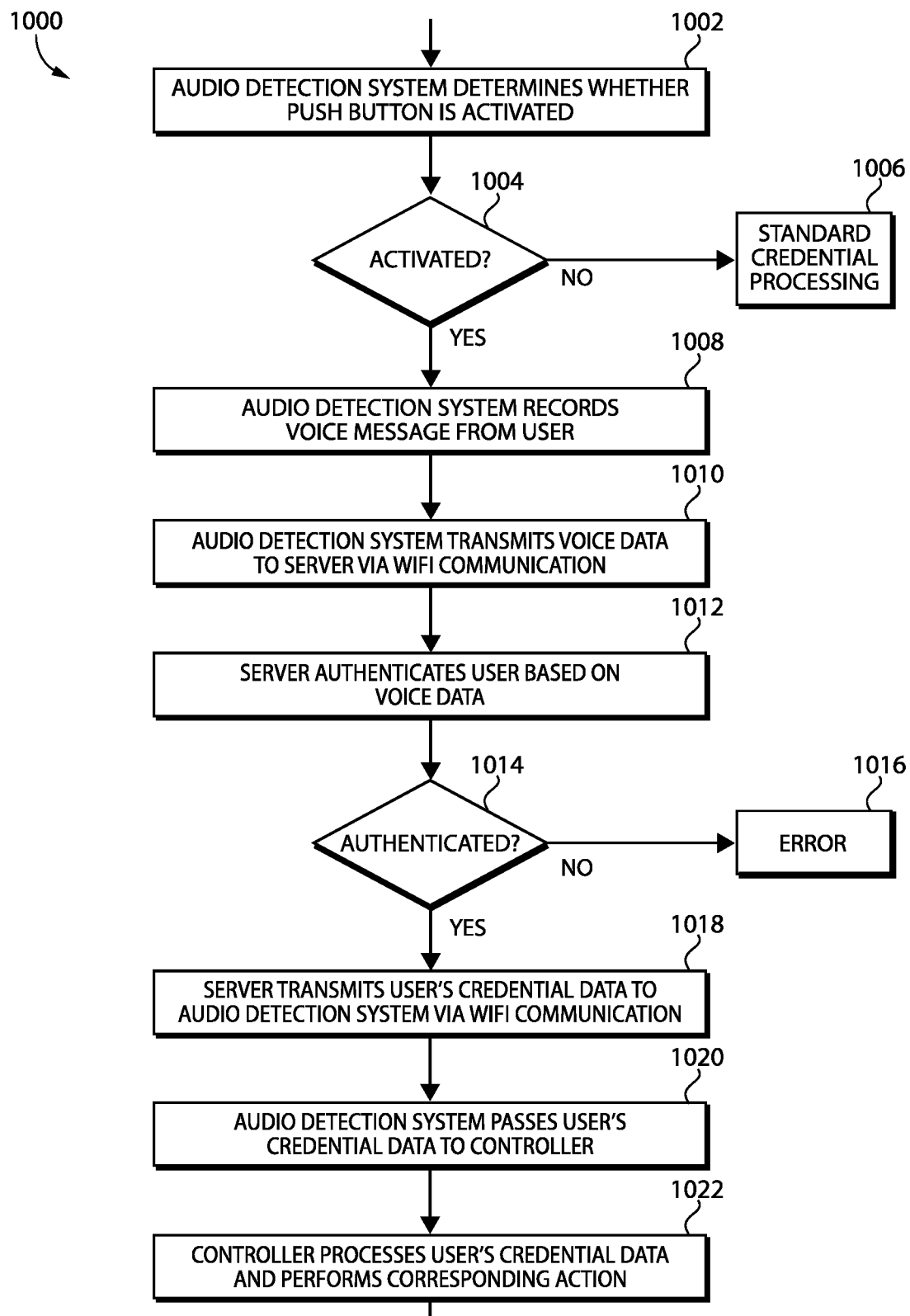
FIG. 10 is a simplified flow diagram of at least one embodiment of a method for authenticating a user based on voice data.

Referring now to FIG. 10, in use, the access control system 100 may execute a method 1000 for authenticating a user based on voice data. It should be appreciated that the particular blocks of the method 1000 are illustrated by way of example, and such blocks may be combined or divided, added or removed, and/or reordered in whole or in part depending on the particular embodiment, unless stated to the contrary. The illustrative method 1000 begins with block 1002 in which the audio detection system 306 determines whether the push button 416 is activated (e.g., whether the push button 416 has been depressed). If the audio detection system 306 determines in block 1004 that the push button 416 has not been activated, the method 1000 advances to block 1006 in which the access control device 302 processes any credential data received via the credential reader 304 (e.g., from a credential device) as would normally occur as described above.

However, if the audio detection system 306 determines in block 1004 that the push button 416 has been activated, the method 1000 advances to block 1008 in which the audio detection system 306 records a voice message from the user. For example, as described above, the audio detection system 306 may record/store approximately four seconds of raw voice data of the user. In block 1010, the audio detection system 306 transmits the voice data to the server 104 via Wi-Fi communication. In particular, the audio detection system 306 may establish a Wi-Fi communication connection with a gateway device or router, which in turn may communicate with the server 104 (e.g., via the Internet) for transmittal of the voice data to the server 104.

In block 1012, the server 104 authenticates the user based on the received voice data. For example, as indicated above, the server 104 may generate a voiceprint that may be compared to reference voiceprints of enrolled users stored in an access control database. If the server 104 determines in block 1014 that a user has not been authenticated based on the processed voice data, the method 1000 advances to block 1016 in which the access control system 100 performs one or more error handling procedures (e.g., terminate the method, wait for additional audio data for verification, utilize a more processing-intensive authentication algorithm, etc.). However, if the server 104 determines in block 1014 that the user has been identified and authenticated based on the processed voice data, the method 1000 advances to block 1018 in which the server 104 transmits the user's credential data to the audio detection system 306 via the Wi-Fi communication connection (e.g., previously established or re-established). In block 1020, the audio detection system 306 passes the user's credential data to the controller 308 and, in block 1022, the controller 308 processes the user's credential data and performs one or more corresponding actions (e.g., activating the electric strike 310 to unlock a door/passageway). As described above, in some embodiments, it should be appreciated that the user credential data received by the audio detection system 306 from the server 104 may be the same (or similar) user credential data that would be received by the credential reader 304 from the corresponding user's credential device when presented. As such, the audio detection system 306 may functionally emulate the user's physical credential based on the user's voice. Although not described specifically in reference to the method 1000 of FIG. 10, it should be appreciated that, in some embodiments, the voice data may also include a command that may be processed by the access control system 100.

Although the blocks 1002-1022 are described in a relatively serial manner, it should be appreciated that various blocks of the method 1000 may be performed in parallel in some embodiments.

As noted above, in certain embodiments, the access control device 102 and/or the mobile device 106 may include an output device 112, such as a speaker or a display. In certain embodiments, the output device 112 may be utilized in combination with the microphone(s) 108, 110 to provide an additional degree of security to the voice-recognition processes described herein.

Figure 11:
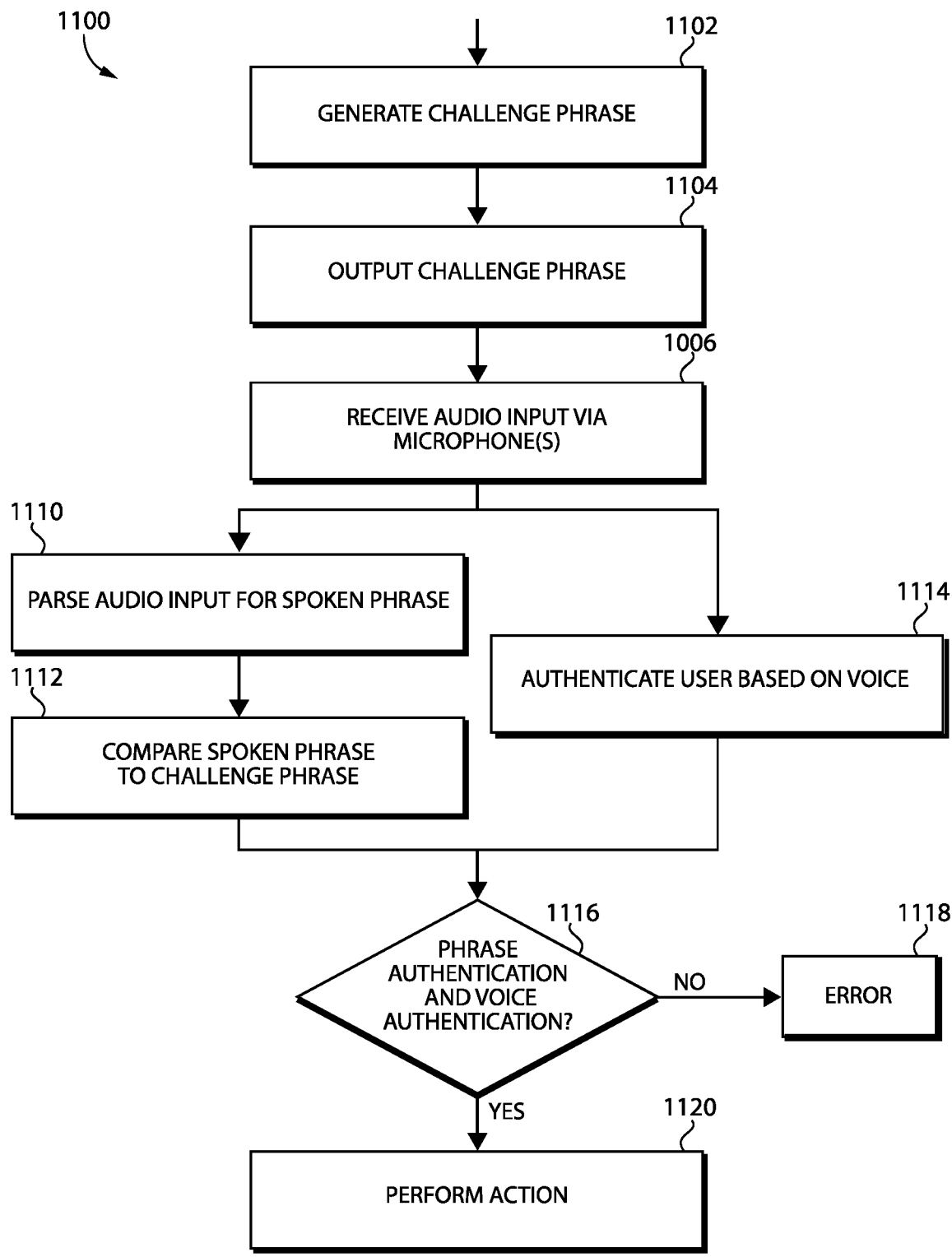
FIG. 11 is a simplified flow diagram of at least one embodiment of a method for authenticating a user based on voice data.
Figure 12:
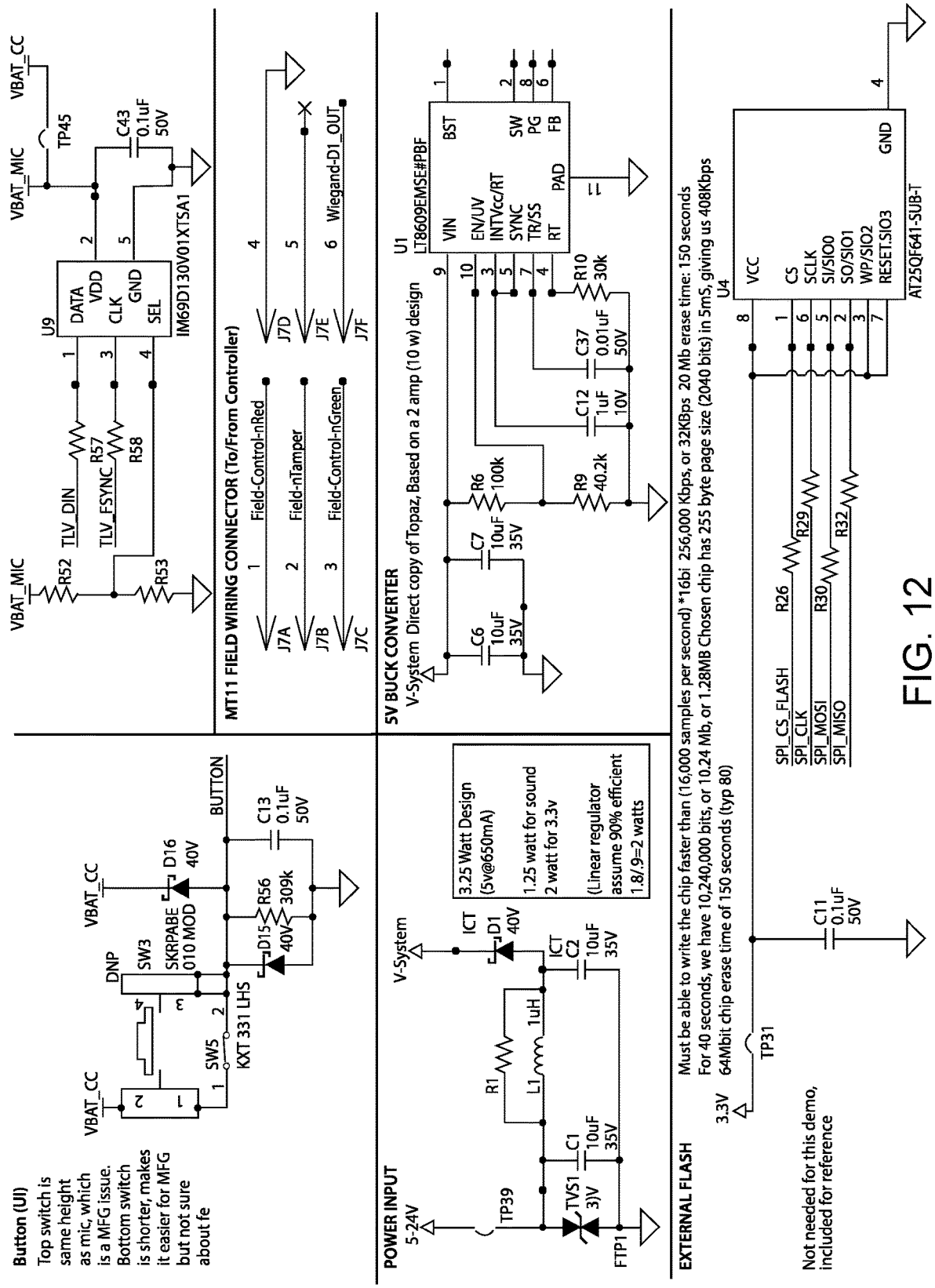
FIGS. 12-18 are electrical schematics of various components of at least one embodiment of the audio detection system of FIG. 4.
Figure 13:
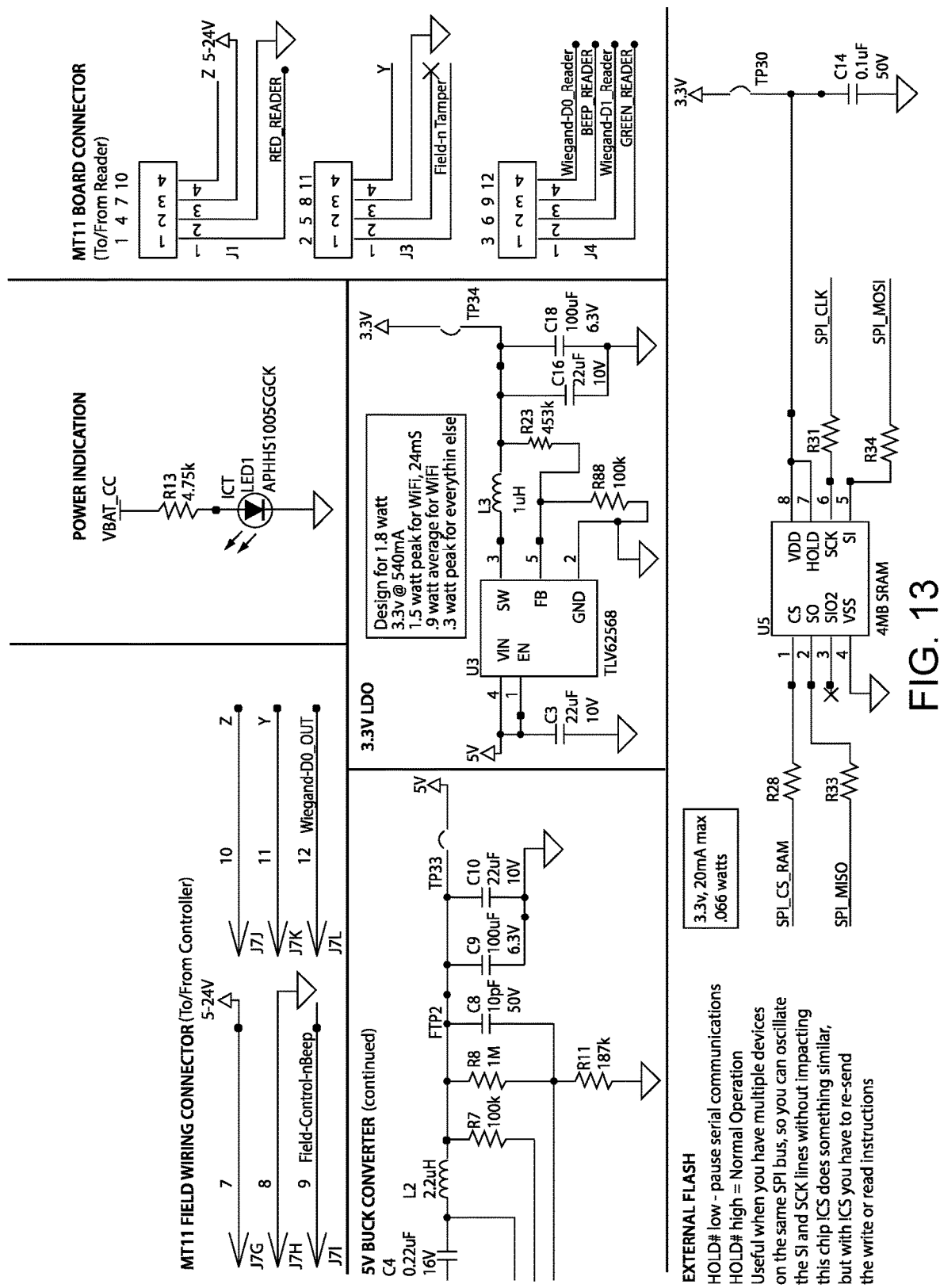
Figure 14:
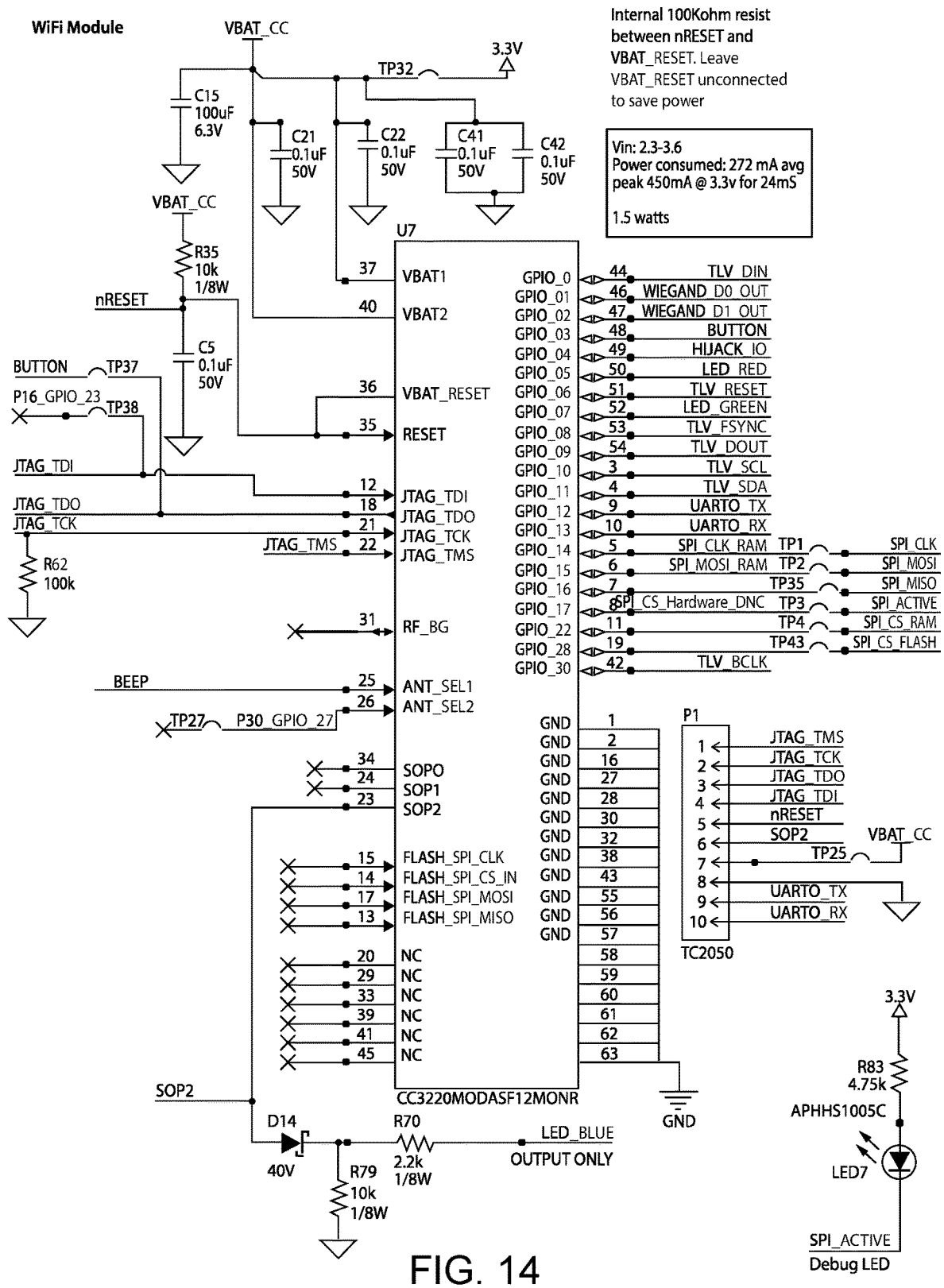
Figure 15:
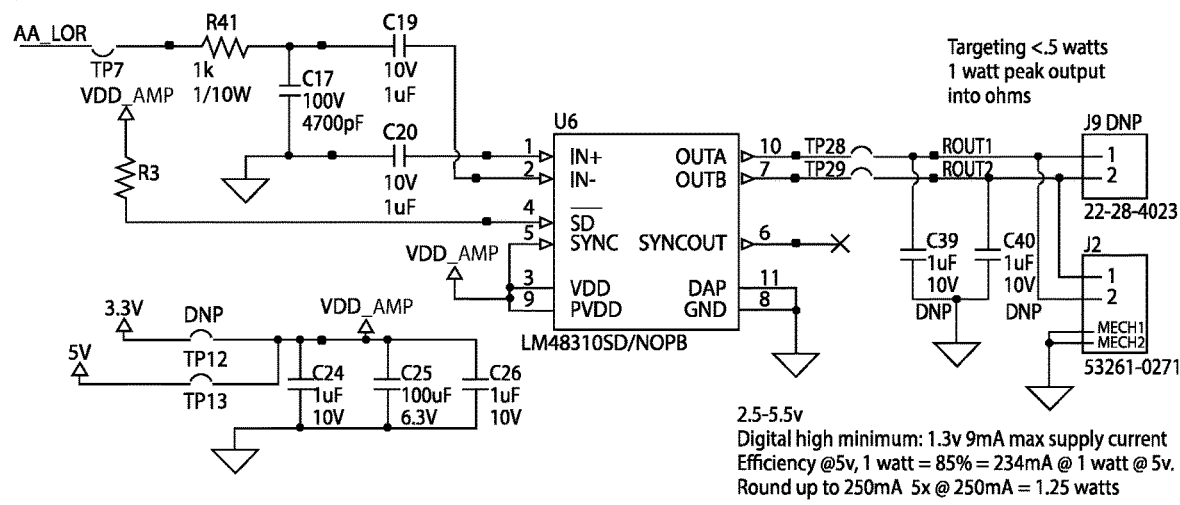
Figure 15:
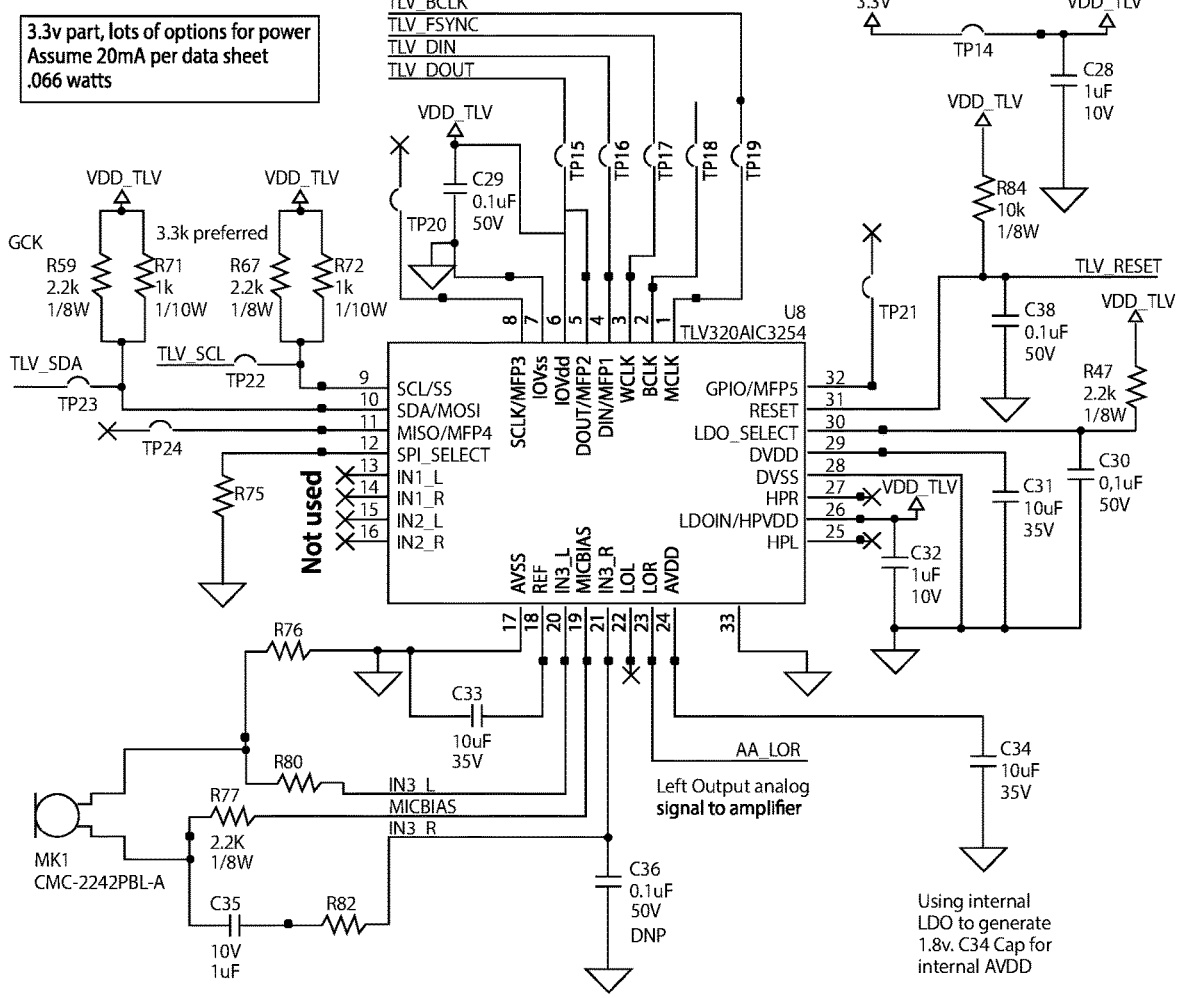
Figure 16:
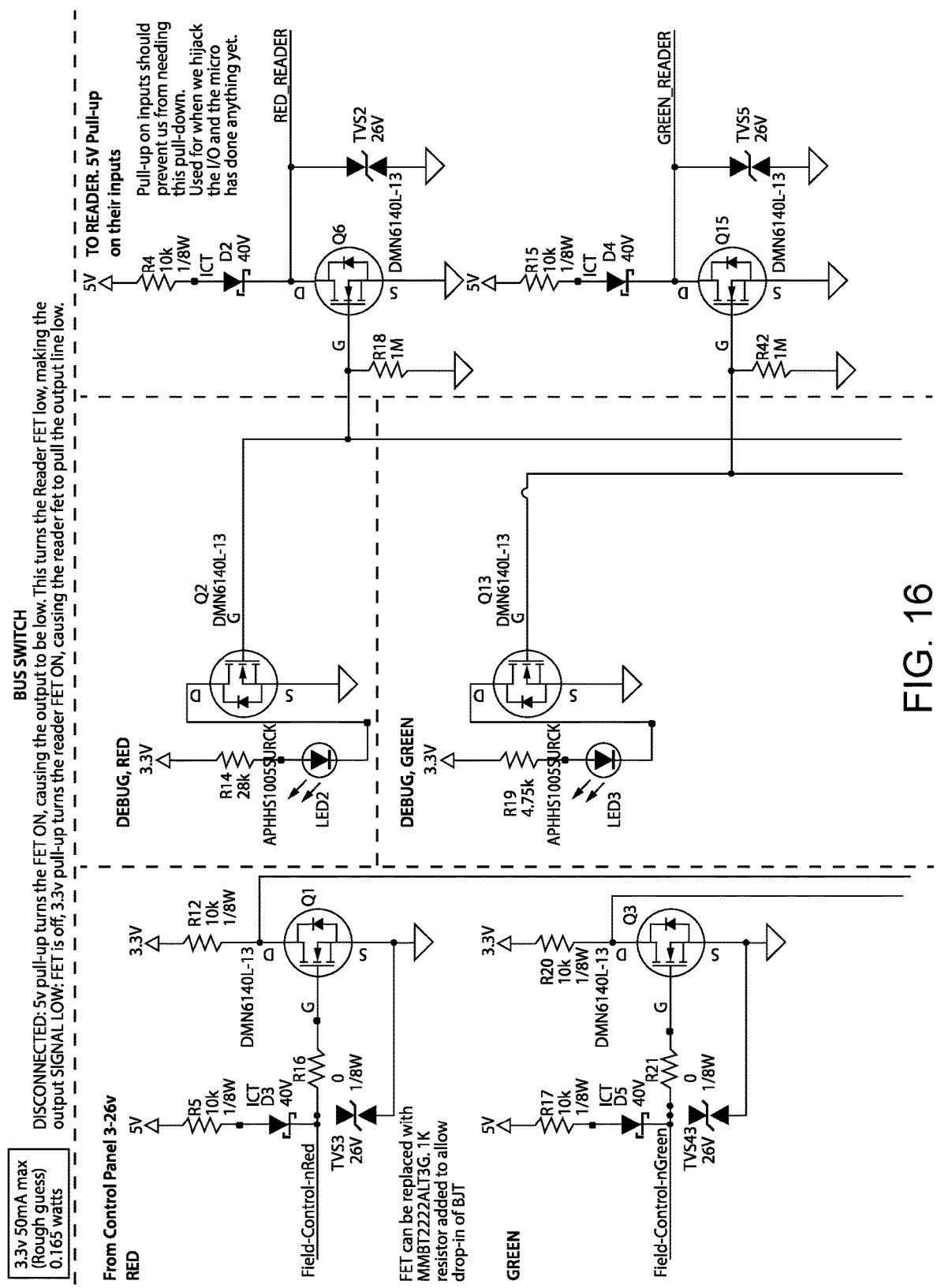
Figure 17:
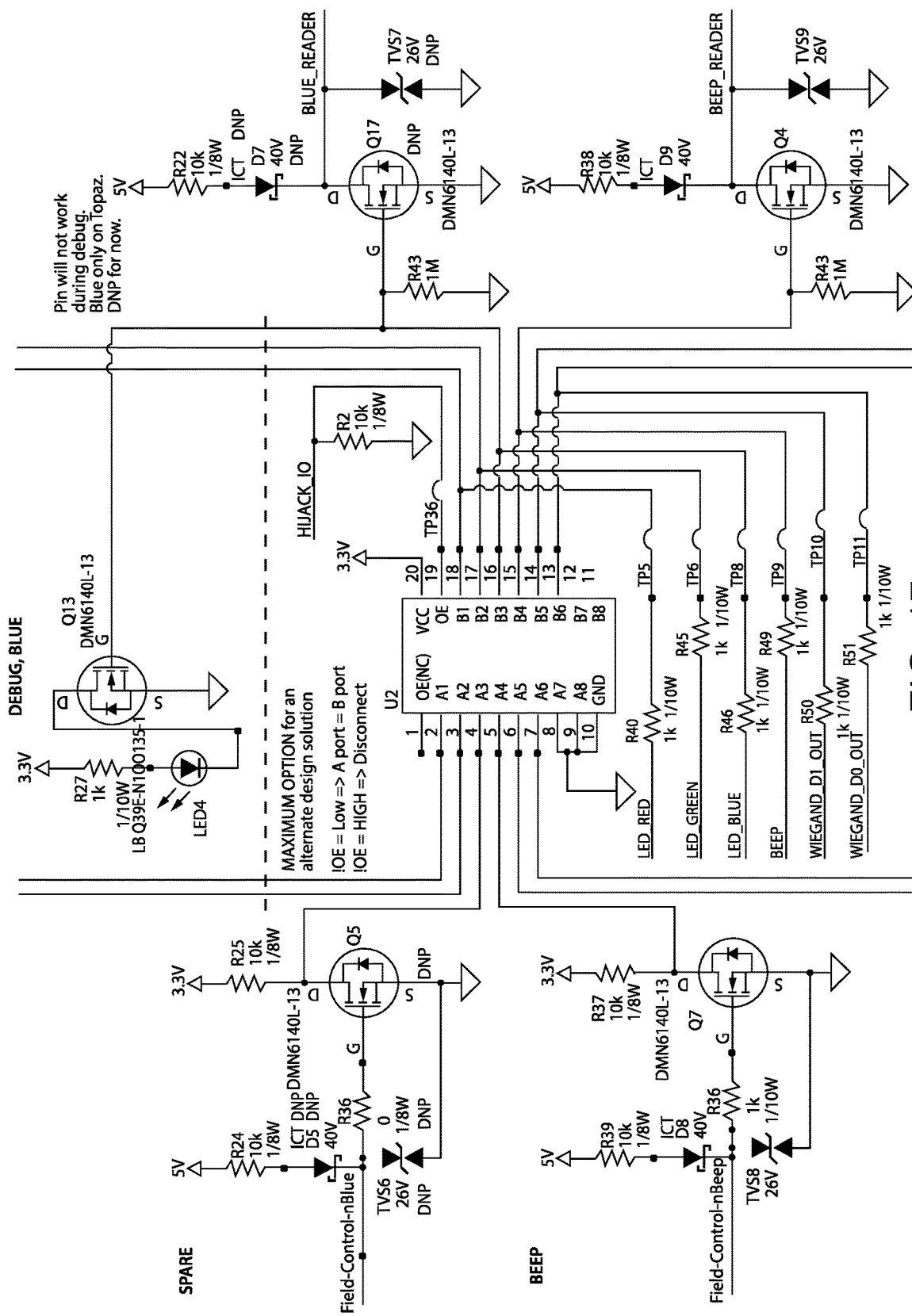
Figure 18:
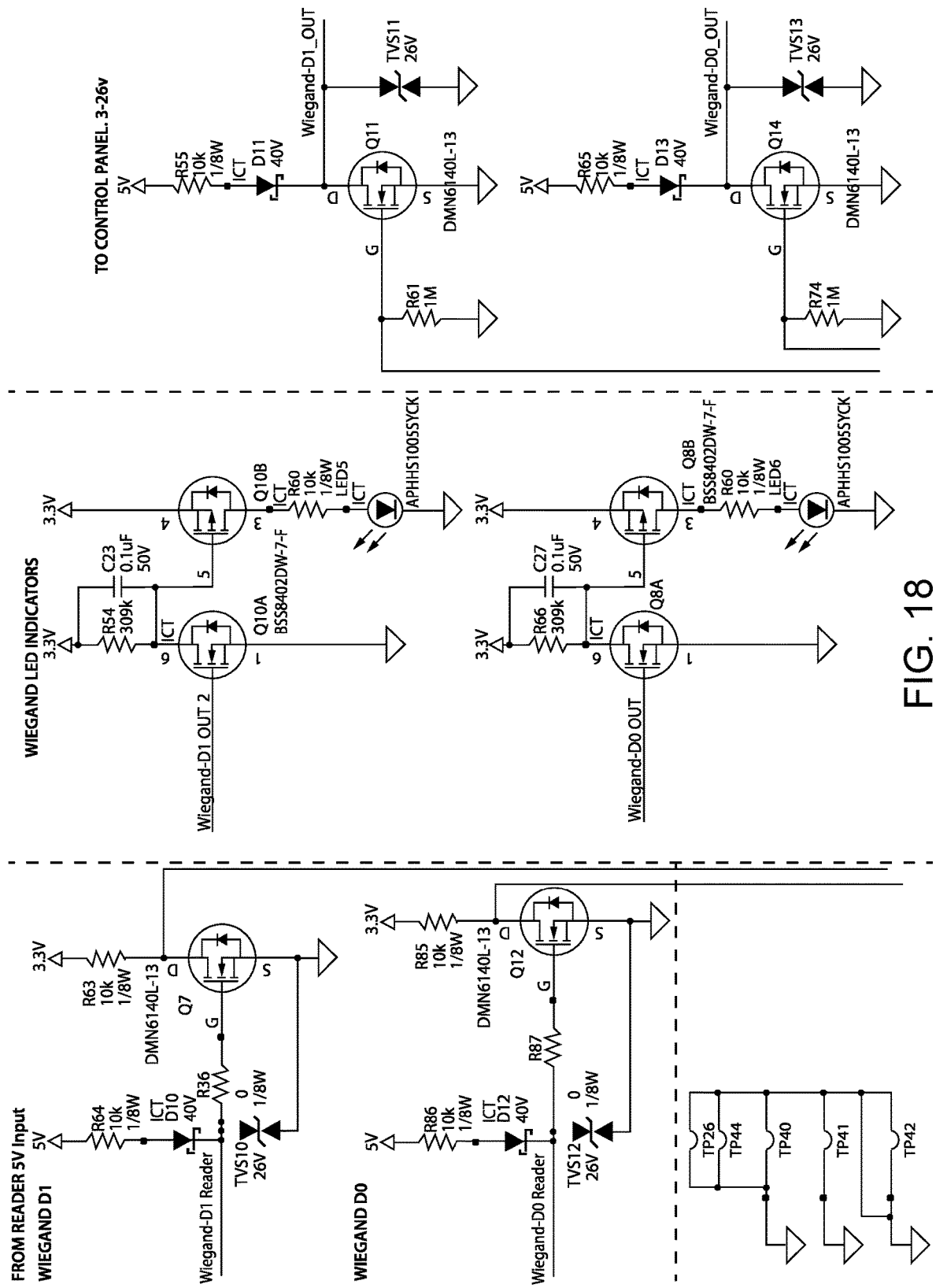

Referring now to FIG. 11, in use, the access control system 100 may execute a method 1100 for authenticating a user based on voice data. It should be appreciated that the particular blocks of the method 1100 are illustrated by way of example, and such blocks may be combined or divided, added or removed, and/or reordered in whole or in part depending on the particular embodiment, unless stated to the contrary. The method 1100 may, for example, be performed in response to actuation of a push button such as the push button 416 described above, or in response to one or more additional or alternative initialization criteria. The illustrative method 1100 begins with block 1102 in which the access control system 100 generates a challenge phrase that is to be spoken by the user. The challenge phrase may, for example, be generated locally at the access control device 102, locally at the mobile device 106, or remotely at the server(s) 104 depending on the particular embodiment.

The challenge phrase may, for example, be generated as a unique combination of words selected from a database of words that is stored in memory for such a purpose. In certain embodiments, the challenge phrase may include a plurality of words, such as at least three words. In certain embodiments, the words may be selected at random from the database. In certain embodiments, in block 1102, the access control system 100 may select the phrase according to logic intended to decrease the probability of a "library attack." For example, the access control system 100 may generate the challenge phrase such that the challenge phrase is nonsensical and/or grammatically incorrect. By way of illustration, such logic may include selecting an adverb to precede a noun and/or a noun to precede an adjective.

In block 1104, the access control system 100 (e.g., the access control device 102 or the mobile device 106) outputs the generated challenge phrase via the output device 112. For example, in embodiments in which the output device 112 comprises a display, the access control system 100 (e.g., the access control device 102 or the mobile device 106) may display the challenge phrase such that the challenge phrase is visible by the user. In embodiments in which the output device 112 comprises a speaker, the access control system 100 (e.g., the access control device 102 or the mobile device 106) may output the challenge phrase using a computer-generated voice such that the challenge phrase can be heard by the user. In certain embodiments, the challenge phrase may be outputted via an output device 112 of the access control device 102. Additionally or alternatively, the challenge phrase may be outputted via an output device 112 of the mobile device 106.

Following the output of the challenge phrase in block 1104, the user speaks the challenge phrase, which is recorded by the access control system 100 (e.g., the access control device 102 or the mobile device 106) as audio input in block 1106, for example via the audio detection system 306. In the illustrative embodiment, the audio input is then processed for authentication according to two factors to ensure that the spoken phrase matches the challenge phrase and the voice speaking the phrase matches the voice of an authorized user. In block 1110, the access control system 100 (e.g., the access control device 102, the server 104, or the mobile device 106) parses the audio input to determine the words spoken by the user and recorded as audio input. In block 1112, the access control system 100 (e.g., the access control device 102, the server 104, or the mobile device 106) compares the spoken phrase to the challenge phrase to determine whether the spoken phrase matches the challenge phrase. In block 1114, the access control system 100 (e.g., the access control device 102, the server 104, or the mobile device 106) processes the audio input to determine whether the voice of the user speaking the phrase is an authorized voice. For example, as indicated above, a voiceprint may be generated based on the audio input and compared to reference voiceprints of enrolled users stored in an access control database.

In the illustrative embodiment of FIG. 11, blocks 1110, 1112 are depicted as being executed in parallel with block 1114. However, it should be appreciated that blocks 1110, 1112 may be executed in series with block 1114 in other embodiments. As one example, the access control device 102 and/or the mobile device 106 may include word recognition algorithms to detect whether the spoken phrase matches the challenge phrase. In such forms, blocks 1110, 1112 may be executed by the access control device 102 and/or the mobile device 106, and the audio input data may be passed on to the device performing the voice recognition of block 1114 (e.g., the server(s) 104) only when the spoken phrase matches the challenge phrase.

In block 1116, the access control system 100 (e.g., the access control device 102, the server 104, or the mobile device 106) determines whether both the phrase and the voice have been authenticated. In other words, the access control system 100 determines whether the spoken phrase has been determined to match the challenge phrase in block 1112 and whether the voice has been determined to match an authorized voice in block 1114. In the illustrative embodiment, if either authentication fails (e.g., if the spoken phrase does not match the challenge phrase and/or the voiceprint does not match an authorized voiceprint), the method 1100 advances to block 1118 in which the access control system 100 determines that an error has occurred and may perform suitable error handling procedures. For example, with the error identified/recorded, the access control system 100 may utilize one or more measures of stalling and/or preventing a brute force attack to discourage unauthorized users from continuing to attempt to gain access.

If both authentications are successful (e.g., if the spoken phrase matches the challenge phrase and the voiceprint matches an authorized voiceprint), the method 1100 advances to block 1120 in which the access control system 100 (e.g., the access control device 102) performs/executes an access control action. For example, in some embodiments, the access control action may involve unlocking a door or otherwise enabling access to an access-controlled region. In some embodiments, additionally or alternatively, the access control system 100 may execute blocks 1018-1022 of FIG. 10 as described above.

As noted above, the illustrative method 1100 involves performing the access control action based upon the authentication of both the phrase and the user's voice. The method 1100 also involves authenticating the spoken phrase to ensure that the spoken phrase matches the challenge phrase, and authenticating the user's voice to ensure that the user speaking the phrase matches an authorized user. Such a combination of authentication parameters results in a high degree of confidence that access is being requested by the authorized user, and that the spoken phrase is not simply a recording of the user made by an attacker during a prior (authorized) attempt by the authorized user to open the door. In other words, the techniques described herein reduce (or eliminate) the risk of an audio replay attack. As should be appreciated, the challenge phrase may be different each time the method 1100 is performed to ensure that the attacker has not simply recorded the authorized user speaking a single challenge phrase.

In certain forms, the challenge phrase consists of words. In other embodiments, the challenge phrase may include numbers. In certain embodiments, the challenge phrase is entirely numeric. However, it has been found that a purely numeric challenge phrase may be susceptible to a library attack in that an attacker may be able to generate a library of an authorized user speaking the digits zero through nine, and then replay the digits in the correct order in an attempt to defeat the access control system. Accordingly, in some embodiments, the challenge phrase may include at least one word (e.g., a plurality of words), and logic may be applied to reduce the likelihood of a successful attack of this type, for example as described above.

Although the blocks 1102-1122 are described in a relatively serial manner, it should be appreciated that various blocks of the method 1100 may be performed in parallel in some embodiments.

According to an embodiment, a method for authenticating a user based on voice data in an access control system comprises electrically disconnecting, by an audio detection system of an access control device, a credential reader of the access control device from a controller of the access control device in response to detecting that an input device of the audio detection system has been activated, recording, by the audio detection system, voice data of a user in a vicinity of the access control device in response to electrically disconnecting the credential reader from the controller, authenticating, by the access control system, the user based on the recorded voice data, wherein authenticating the user comprises identifying credential data associated with the user, transmitting, by the audio detection system, the credential data to the controller in response to successful authentication of the user based on the recorded voice data, and performing, by the controller, an access control function in response to receiving the credential data.

In some embodiments, the method may further include electrically connecting, by the audio detection system, the credential reader to the controller in response to authentication of the user based on the recorded voice data.

In some embodiments, authenticating the user based on the recorded voice data may include transmitting, by the audio detection system, the voice data to a server over a Wi-Fi communication connection and receiving, by the audio detection system and from the server, the credential data associated with the user in response to successful authentication of the user based on the recorded voice data by the server.

In some embodiments, authenticating the user based on the recorded voice data may include transmitting, by the audio detection system, the voice data to a server over an Ethernet communication connection and receiving, by the audio detection system and from the server, the credential data associated with the user in response to successful authentication of the user based on the recorded voice data by the server.

In some embodiments, performing the access control function may include transmitting a signal to at least one of an electric strike, an electronic latch, or a maglock to unlock a lock mechanism.

In some embodiments, electrically disconnecting the credential reader from the controller may include electrically disconnecting the credential reader from the controller via a bus switch electrically coupled to each of the credential reader and the controller.

According to another embodiment, a method for audio-based access control may include receiving audio input by a microphone of an access control device that controls access through a passageway, processing an audio signal associated with the audio input to identify and authenticate a user, determining a command corresponding with the audio signal in response to identification and authentication of the user, and performing at least one action that corresponds with the command.

In some embodiments, processing the audio signal may include processing the audio signal locally by the access control device to identify and authenticate the user.

In some embodiments, processing the audio signal may include transmitting audio data corresponding with the audio signal to a server and processing the audio data by the server to identify and authenticate the user.

In some embodiments, the audio input may correspond with a voice command.

According to yet another embodiment, a method for audio-based access control may include generating a challenge phrase to be spoken by a user of an access control system, outputting the challenge phrase to the user, receiving audio input by a microphone, the audio input including information relating to a spoken phrase spoken by the user, processing an audio signal associated with the audio input to authenticate the spoken phrase based on a comparison with the challenge phrase, processing the audio signal to authenticate the user based on a comparison with an authorized voice, and performing, by the access control system, an access control action based on authentication of the spoken phrase and authentication of the user.

In some embodiments, outputting the challenge phrase to the user may include visually outputting at least a portion of the challenge phrase via a display.

In some embodiments, outputting the challenge phrase to the user may include audibly outputting at least a portion of the challenge phrase via a speaker.

In some embodiments, the challenge phrase may include at least three words.

In some embodiments, processing the audio signal to authenticate the spoken phrase comprises processing the audio signal, by a first device, to authenticate the spoken phrase, processing the audio signal to authenticate the user comprises processing the audio signal, by a second device, to authenticate the user, and the method may further include transmitting the audio signal from the first device to the second device in response to authentication of the spoken phrase by the first device.

In some embodiments, the first device may be a mobile device of the user. In other embodiments, the first device may be an access control device of the access control system.

In some embodiments, the second device may be a remote server.

In some embodiments, generating the challenge phrase may include generating the challenge phrase in response to actuation of a push button of the access control system.

In some embodiments, access to a secured location via an entryway may be controlled by the access control system, and performing the access control action may include granting access to the secured location via the entryway.

What is claimed is:

1. A method for audio-based access control, the method comprising:
    receiving audio input by a microphone of an audio detection device of an access control system that controls access through a passageway;
    processing an audio signal associated with the audio input to identify and authenticate a user and, in response to the user not being identified and authenticated, processing the audio signal to determine the audio signal is non-voice data;
    determining a command corresponding with the audio signal in response to identification and authentication of the user and corresponding with the non-voice data in response to the user not being identified and authenticated; and
    performing at least one action that corresponds with the command.

2. The method of claim 1, wherein processing the audio signal comprises processing the audio signal locally by the access control system to identify and authenticate the user.

3. The method of claim 1, wherein processing the audio signal comprises:
    transmitting audio data corresponding with the audio signal to a server; and
    processing the audio data by the server to identify and authenticate the user.

4. The method of claim 1, wherein the audio input corresponds with a voice command.

5. The method of claim 1, further comprising electrically disconnecting a credential reader from a controller of the access control system and transmitting the audio input to a remote server.

6. The method of claim 5, wherein the electrically disconnecting the credential reader from the controller is in response to detecting that the microphone of the audio detection device has been activated.

7. The method of claim 5, further comprising electrically connecting, by the audio detection device, the credential reader to the controller in response to authentication of the user.

8. The method of claim 5, wherein the electrically disconnecting the credential reader from the controller comprises activating a bus switch electrically coupled to each of the credential reader and the controller.

9. The method of claim 1, wherein in response to authenticating the user via the processing of the audio signal associated with the audio input, transmitting credential data for the user from the remote server to the controller of the access control system.

10. The method of claim 9, wherein the transmitted credential data emulates user credential data that is received by the credential reader of the access control system in response to the user presenting a user credential device to the credential reader.

11. The method of claim 9, wherein the performing the at least one action is in response to the credential data transmitted to the controller.

12. The method of claim 11, wherein the authenticating the user based on the recorded voice data comprises transmitting, by the audio detection system, the voice data to a server over a Wi-Fi communication connection or an Ethernet communication connection.

13. The method of claim 12, wherein the authenticating the user based on the recorded voice data further comprises receiving, by the audio detection system and from the server, the credential data associated with the user in response to successful authentication of the user based on the recorded voice data by the server.

14. The method of claim 1, further comprising:
    generating a challenge phrase to be spoken by the user of the access control system; and
    outputting the challenge phrase to the user;
    wherein the audio input includes information relating to a spoken phrase spoken by the user; and
    wherein the processing the audio signal associated with the audio input comprises to authenticate the spoken phrase based on a comparison with the challenge phrase.

15. A method for audio-based access control, the method comprising:
    recording, by an audio detection system, audio inputs including voice data of a user and non-voice data in a vicinity of an access control system;
    authenticating the user, by the access control system, based on the recorded voice data and based on credential data associated with the user;
    transmitting, by the audio detection system, the credential data to the controller in response to successful authentication of the user based on the recorded voice data;
    processing the audio input to determine the audio input is non-voice data and a command that is associated with the non-voice data in response the user not being authenticated; and
    performing, by the controller, an access control function in response to receiving the credential data or the command in response to determining the audio input is non-voice data.

16. The method of claim 15, wherein the recording of the voice data is in response to electrically disconnecting a credential reader from a controller of the access control system.

17. The method of claim 16, wherein the electrically disconnecting the credential reader from the controller is in response to detecting that an input device of the audio detection system has been activated.

18. The method of claim 16, further comprising electrically connecting, by the audio detection system, the credential reader to the controller in response to authentication of the user based on the recorded voice data.

19. The method of claim 16, wherein electrically disconnecting the credential reader from the controller comprises activating a bus switch electrically coupled to each of the credential reader and the controller.

20. The method of claim 15, wherein performing the access control function comprises transmitting a signal to at least one of an electric strike, an electronic latch, or a maglock to unlock a lock mechanism.

\* \* \* \* \*